(12) United States Patent
Muirbrook et al.

(10) Patent No.: US 9,286,733 B2
(45) Date of Patent: *Mar. 15, 2016

(54) LOCATION BASED SYSTEMS FOR ENTRY AND EXIT

(75) Inventors: Carl Muirbrook, Turlock, CA (US);
Michael Hunter, Provo, UT (US);
Barney Pell, Menlo Park, CA (US)

(73) Assignee: LOCOMOBI INC. (CA)

( * ) Notice: Subject to any disclaimer, the term of this patent is extended or adjusted under 35 U.S.C. 154(b) by 618 days.

This patent is subject to a terminal disclaimer.

(21) Appl. No.: 13/528,592

(22) Filed: Jun. 20, 2012

(65) Prior Publication Data

US 2012/0265585 A1    Oct. 18, 2012

Related U.S. Application Data

(63) Continuation-in-part of application No. 13/066,359, filed on Apr. 12, 2011, now Pat. No. 9,031,868.

(60) Provisional application No. 61/626,718, filed on Oct. 1, 2011, provisional application No. 61/626,911, filed on Oct. 5, 2011, provisional application No. 61/627,222, filed on Oct. 8, 2011, provisional application No. 61/627,992, filed on Oct. 21, 2011.

(51) Int. Cl.
*G06Q 30/00* (2012.01)
*G07B 15/02* (2011.01)
(Continued)

(52) U.S. Cl.
CPC ............ *G07B 15/02* (2013.01); *G06Q 20/20* (2013.01); *G06Q 20/3224* (2013.01); *G06Q 20/3276* (2013.01); *G06Q 30/06* (2013.01);
(Continued)

(58) Field of Classification Search
CPC ........................................... G07B 15/02
USPC .............................. 705/26.1–27.2; 235/378
See application file for complete search history.

(56) References Cited

U.S. PATENT DOCUMENTS 7,053,767 B2    5/2006   Petite et al. ................... 340/531
RE39,736 E     7/2007   Morrill, Jr.
(Continued)

FOREIGN PATENT DOCUMENTS

JP      2003-296898     10/2003    ............... G08G 1/14
KR    10-2004-0070953    8/2004    ............... H04Q 7/24
(Continued)

OTHER PUBLICATIONS

Smith, T. K. (2000). Meet inspector gadget. Journal of Property Management, 65(3), 42-46. Retrieved from http://search.proquest.com/docview/216400865?accountid=14753.*
(Continued)

*Primary Examiner* — Resha Desai
(74) *Attorney, Agent, or Firm* — Hayes Soloway P.C.

(57) ABSTRACT

A system and methods using applications for entry and exit from registered locations, where a registered location has an associated geo-fence of any size or shape. A registered location may be mobile or stationary. An internet-connected device running an app transmits the current geographic location of the device, and a remote processing center executes a default action when finding correspondence between the geo-fence of a registered location and the current geographic information of an end user's device, and in one embodiment, the default action may be to enter and pay for parking at a registered location.

15 Claims, 18 Drawing Sheets

(51) Int. Cl.
*G06Q 30/06* (2012.01)
*G06Q 20/20* (2012.01)
*G06Q 20/32* (2012.01)
*G07F 17/24* (2006.01)

(52) U.S. Cl.
CPC ........ *G06Q30/0613* (2013.01); *G06Q 30/0633* (2013.01); *G06Q 30/0639* (2013.01); *G07F 17/24* (2013.01)

(56) References Cited

U.S. PATENT DOCUMENTS

| | | | |
|---|---|---|---|
| 7,539,500 | B2 | 5/2009 | Chiang |
| 7,714,742 | B1 | 5/2010 | Noworolski |
| 7,805,239 | B2 | 9/2010 | Kaplan et al. |
| 7,848,980 | B2 | 12/2010 | Carlson |
| 8,004,426 | B2 | 8/2011 | Dasgupta |
| 2002/0008639 | A1 | 1/2002 | Dee |
| 2002/0023010 | A1 | 2/2002 | Rittmaster et al. |
| 2004/0212518 | A1 | 10/2004 | Tajima et al. ................. 340/928 |
| 2005/0280555 | A1 | 12/2005 | Warner, IV ................ 340/932.2 |
| 2006/0128397 | A1 | 6/2006 | Choti et al. |
| 2006/0259354 | A1* | 11/2006 | Yan ................................ 705/13 |
| 2007/0150336 | A1* | 6/2007 | Boily .............................. 705/13 |
| 2007/0203836 | A1 | 8/2007 | Dodin |
| 2008/0010190 | A1 | 1/2008 | Rackley, III et al. |
| 2008/0010192 | A1 | 1/2008 | Rackley, III et al. |
| 2008/0010193 | A1 | 1/2008 | Rackley, III et al. |
| 2008/0059375 | A1 | 3/2008 | Abifaker |
| 2008/0167000 | A1 | 7/2008 | Wentker et al. |
| 2008/0167017 | A1 | 7/2008 | Wentker et al. |
| 2008/0167961 | A1 | 7/2008 | Wentker et al. |
| 2009/0066476 | A1 | 3/2009 | Raheman |
| 2009/0254479 | A1 | 10/2009 | Pharris et al. |
| 2009/0327061 | A1 | 12/2009 | Wren |
| 2010/0007525 | A1 | 1/2010 | Shanbhag et al. ......... 340/932.2 |
| 2010/0169212 | A1 | 7/2010 | Paintin |
| 2010/0201536 | A1 | 8/2010 | Robertson et al. |
| 2010/0274693 | A1 | 10/2010 | Bause et al. .................... 705/32 |
| 2011/0060600 | A1 | 3/2011 | Fox et al. |
| 2011/0238464 | A1 | 9/2011 | Dasgupta ........................ 705/13 |
| 2012/0130775 | A1* | 5/2012 | Bogaard et al. ................. 705/13 |
| 2012/0284209 | A1 | 11/2012 | Duffy et al. .................... 705/418 |
| 2013/0132167 | A1 | 5/2013 | Krug et al. ...................... 705/13 |

FOREIGN PATENT DOCUMENTS

| | | | |
|---|---|---|---|
| KR | 10-2005-0015772 | 2/2005 | ............. G06F 19/00 |
| KR | 10-2007-0033615 | 3/2007 | |
| WO | WO0011616 | 3/2000 | ............. G07B 15/00 |
| WO | WO 2004/070674 | 8/2004 | |
| WO | WO2005086097 | 9/2005 | ............. G07B 15/02 |
| WO | WO2009049859 | 4/2009 | |

OTHER PUBLICATIONS

International Search Report and Written Opinion issued in corresponding Patent Appln. Serial No. PCT/US2012/057400 dated Mar. 29, 2013 (13 pgs).

Office Action issued in related U.S. Appl. No. 13/066,359, dated Mar. 13, 2014 (17 pgs).

International Preliminary Report on Patentability issued in related Application No. PCT/US2012/057400, dated Apr. 10, 2014 (10 pgs).

European Patent Office communication issued in related European Patent Appln. Serial No. 11 769 472.9-1958 dated Apr. 28, 2014 (6 pgs).

Office Action issued in related U.S. Appl. No. 13/066,359 dated Aug. 30, 2013 (20 pgs.).

Australian Patent Examination Report No. 1 issued in related application No. 2011240614, dated May 21, 2014 (3 pgs).

Supplemental European Search Report issued in corresponding application No. 11769472.9, dated Apr. 4, 2014 (3 pgs).

Office Action issued in related U.S. Appl. No. 13/066,359, dated Oct. 8, 2014 (36 pgs).

Australian Patent Examination Report No. 1 issued in related application No. 2012316064, dated Aug. 20, 2014 (4 pgs).

Notice of Allowance issued related U.S. Appl. No. 13/066,359, dated Jan. 8, 2015 (11 pgs).

Worthington, S., & Edwards, V. (2000). Changes in payments markets, past, present and future: A comparison between Australia and the UK. The International Journal of Bank Marketing, 18(5), 212-221.

Australian Examination Report No. 2 issued in application No. 2012316064, dated May 14, 2015 (6 pgs).

International Search Report and Written Opinion issued in application No. PCT/US2015/044705, dated Oct. 28, 2015 (10 pgs).

* cited by examiner

FIG. 14

| ENTER OPTIONAL USER PARAMETER (220) | |
|---|---|
| 220a | Vehicle information |
| 220b | Boat, airplane or other device information |
| 220c | User identification information |
| 220d | Approved registered locations 10 |
| 220e | Maximum purchase amount |
| 220f | Other information, limitation, or parameter |

| ENTER PAYMENT INFORMATION (210) | |
|---|---|
| 210a | Credit, debit, gift or bank card information |
| 210b | On-line payment |
| 210c | Third-party payment |
| 210d | Check |
| 210e | Cash |
| 210f | Other payment options |

| ENTER REGISTERED LOCATION INFORMATION | |
|---|---|
| 110 | Geographic information of location |
| 120a | Fee structure |
| 120b | Permitted times of access |
| 120c | Type of location (business, parking, etc.) |
| 120d | Approved end users, customers and clients |
| 120e | Loyalty program |
| 120f | Other information |

550 — 40

| DEFAULT ACTIONS 570 and 5700 | |
|---|---|
| Entered by end user (250) or Entered by System Operator (252) | |
| 532 | Activate scanner 32 |
| 572 | Charge End User payment option 210 |
| 573 | Prompt or Query End User |
| 574 | Other action |
| 575 | Time stamp |
| 577 | Generate unique session record |
| 5724 | Open or close a barrier 17 |
| 5725 | Transmit receipt to end user OR registered location |
| 5726 | Lock or unlock a lock |
| 5727 | Other action |
| 5728 | Lift or lower a gate arm 17a |

LOCATION BASED SYSTEMS FOR ENTRY AND EXIT

CROSS-REFERENCE TO RELATED APPLICATIONS

This application is a continuation in part of U.S. application Ser. No. 13/066,359, filed Apr. 12, 2011, which is herein incorporated by reference in its entirety, and which claims the benefit of U.S. Provisional Application No. 61/342,328 filed Apr. 13, 2010, which is herein incorporated by reference in its entirety; and this application claims the benefit of U.S. Provisional Application No. 61/626,718 filed Oct. 1, 2011, which is herein incorporated by reference in its entirety; and this application claims the benefit of U.S. Provisional Application No. 61/626,911 filed Oct. 5, 2011, which is herein incorporated by reference in its entirety; and this application claims the benefit of U.S. Provisional Application No. 61/672,222 filed Oct. 8, 2011, which is herein incorporated by reference in its entirety; and this application claims the benefit of U.S. Provisional Application No. 61/627,992 filed Oct. 21, 2011, which is herein incorporated by reference in its entirety.

BACKGROUND OF THE INVENTION

1. Field of the Invention

There is an increasing demand by users for convenient systems based on internet-connected devices, including mobile telephones, hand-held devices, car-phones, laptop computers, or other electronic devices to obtain and pay for goods or services. Often, these devices use software commonly known as an application, or "app"; a piece of software that can run on the internet, on a computer, on a mobile phone or other electronic device.

2. Description of the Related Art

Entry systems use a variety of ways to record when a person or vehicle enters and exits a facility or space. Some entry systems may charge an entrance fee, either flat or incremental. When charging an incremental fee, many existing systems time-stamp entry and exit to determine elapsed time and calculate the proper incremental rate.

As a non-limiting description of related art, some entry and exit transactions occur at parking facilities. Attended parking facilities may have a worker on site to record vehicle arrival and accept payment upon vehicle leaving. These attended parking facilities may charge a variable fee based on the length of time that a vehicle is parked in the lot, garage or other parking facility.

Unattended parking facilities may not have an attendant on site throughout the entire day, so the attendant is not there to record when vehicles arrive or leave. Therefore these parking facilities typically charge a flat fee. Other unattended facilities do not have a gate or full-time attendant, and a worker goes to the facility at various times during the day to determine if all parked vehicles have paid the entrance fee. Alternatively, some unattended parking facilities charge a variable fee based on the length of time parked, however these facilities make a substantial investment in gates, gate arms or other moveable barriers, and terminals to record the time of entrance, exit and determine elapsed time and incremental fee.

In addition, there are other existing situations in which a barrier opens to allow entry and exit to and from a secured space, and to optionally charge a flat or incremental fee. Other non-limiting descriptions of related art include systems for entrance to, exit from, and optionally paying for, a locker, storage space, hotel room, conference room, a vault or safe, amusement park, game spaces, and gyms.

BRIEF SUMMARY OF THE INVENTION

Embodiments of the invention comprise a system for location-based entry into and exit from a secured space that is a registered location 10, using an app 20 running on a mobile, internet-connected device 30. The secured space may be any shape or size, and is registered with the system by entering geographic location information 110 of the secured space into a remote processing center 40. In some embodiments a mobile device with app 20 transmit its current geographic location 240 to the remote processing center. When the remote processing center finds correspondence 550 between the geographic information 240 transmitted from the mobile device and the geographic information 110 of a registered location, the processing center may execute one or more default actions, as non-limiting examples, opening a barrier, unlocking a door or disarming a security system, recording a time stamp, or charging a fee.

Some embodiments of the invention comprise a system for location-based entry and exit from a registered facility after payment of an entrance fee. An end user with app 20 on mobile device 30 may immediately begin using the system to pay the entrance fees at a registered facility, and the facility provider may immediately begin using the system to collect entrance fees. There is no need for any additional hardware or workers at the registered location to operate the system.

In these embodiments, when app 20 is launched or running, the mobile internet-connected device 30 continuously or intermittently transmits to the remote processing center 40 information comprising the current geographic location 240 of the device. The remote processing center analyzes the geographic information 240 transmitted from the mobile internet-connected device, and compares this with the geographic information 110 of all registered locations 10. The processing center analyzes the data to determine if the geographic location 240 of the mobile internet-connected device corresponds 550 to the geographic location 110 of a registered facility.

Correspondence 550 may be found when the mobile internet connected device 30 is within a specific geographic distance 551 of a registered location, sometimes referred to as being within a geo-fence. The geofence may be any shape or size. Correspondence may also be found when a geofence around an end user's mobile device intersects with the geofence of a registered location.

When analysis by the processing center finds correspondence between the geographic location 240 of the mobile internet-connected device and the geographic location information 110 of a registered facility, the processing center may execute a default action 570 to charge the end user an entrance fee.

A default action 570 may be linked 250 to each registered location by either the system operator or by the end user. In many embodiments, the system operator will link 250 a specific default action 570 to a class of registered facilities.

In some embodiments the linked 250 default action may be to charge an entrance fee. As a non-limiting example, registered location 10 may be a parking facility. When app 20 running on mobile device 30 associated with a vehicle enters the geo-fence of a registered parking facility, the remote processing center finds correspondence 550, and executes 570 the default action to charge a fee.

The remote center 40 associates a vehicle with mobile device 30 upon entry of vehicle information 220a. The system allows the end user to modify the associated vehicle information 220a, or to have multiple vehicles associated with a single mobile internet connected device.

The system may function in a similar manner in other instances where a registered facility charges an entrance fee, as non-limiting examples, payment of docking or slip fees at a marina, or paying airport landing fees. When the processing center finds correspondence 550 between a mobile device and associated boat, and a registered marina, or between device and associated airplane, and registered airport, the processing center may execute a default action 570 to charge the user the facility fee. The remote processing center may transmit a receipt to the facility operator, so the operator can verify that the associated vehicle has paid the entrance fee, and may transmit a confirmation receipt to the end user.

In some embodiments, when processing center 40 finds geographic correspondence 550, the default action 570 may be to open a moveable physical barrier, unlock a door, disarm a security system, charge a fee, or a combination of these or other actions. In other embodiments, the default action may be to transmit a QR code or other code 576 to the end user's mobile device 30

In some embodiments, a registered space may have a moveable, physical barrier 17 that opens to grant access to the space. Moveable physical barrier 17 may comprise any barrier, door, gate, door, lock or security system that may be disarmed to grant access to a registered space.

In some embodiments, moveable physical barrier 17 may open to grant access to a space that charges a fee for access based on increments of time. Non-limiting examples include parking facilities, lockers, storage facilities, hotel or conference rooms, entrances to game spaces, or any other space separated from another space that charge for entrance and usage based on time.

In these embodiments, moveable physical barrier 17 connects with hardware 15 that opens and closes the barrier 17. Hardware 15 is in communication with software 12 and operates to open or close the barrier in response to instructions communicated from software 12 to hardware 15. Software 12 is simultaneously in communication with the remote processing center 40. Using cloud technology, information, instructions and signals may be transmitted between and among hardware 15, software 12, and remote processing center 40.

In instances where processing center 40 finds correspondence 550 between mobile device 30 and a registered location 10, processing center 40 may transmit instructions to the software 12, instructing the software to communicate with barrier hardware 15 to open barrier 17. Once barrier 17 is open, the end user may enter the registered location.

Some embodiments comprise a system for location-based entry and exit from one or more registered parking facilities with a moveable physical barrier 17 at the entrance, comprising entering, into a remote processing center, geographic information 110 of at least one parking facility and a fee structure 120a for that parking facility.

A non-limiting embodiment of a moveable physical barrier 17 is gate arm 17a connected with hardware 15 in communication with software 12. When the processing center 40 finds correspondence 550 the remote processing center may instruct the software 12 to communicate with hardware 15 to raise the gate arm and let the end user with mobile device 30 and associated vehicle enter facility 10. The remote processing center also may time stamp the user's entrance, and may generate an open unique parking session record associated with that user. The user may park the vehicle.

When end user wishes to leave the parking facility, app 20 transmits to processing center 40 a request to exit the parking facility. The remote processing center analyzes the request to exit. When analysis by the processing center finds the request to exit is sent from a mobile device associated with an open unique parking session record, processing center sends instructions to the gate software 12 to open the gate 17, records the parking session ending time, and closes the unique parking session. The end user exits the parking facility, and the gate closes. The processing center may send confirmation receipts to the parking facility operator, so that the operator may verify which vehicles have paid to park using the system.

The processing center 40 calculates an end user payment based on the elapsed time and the parking facility rate structure 120a, and charges the calculated amount to the end user's payment option 210. The calculation and charge by the processing center may occur before, during or after opening the gate. These embodiments optionally may encode sophisticated logic, as non-limiting examples, parking validation, coupons, special rates, personalized rates, loyalty programs, or other information. The system works whether paying by app, voice, or text message.

Embodiments of invention may give greater flexibility to parking facility operators or other operators of facilities that charge for entrance, and may eliminate or reduce the need for a payment processing or access devices. Facility operators may use embodiments of the invention to charge users a flat or variable fee, without the need for investment in hardware. The fee can be varied depending on a variety of parameters, giving a registered facility greater flexibility in pricing structure through use of the invention.

In some embodiments, a registered location 10 may be coupled with registered readable code 14. When the processing center finds correspondence 550 between the user's location 240 and the registered geographic location 110 of a location 10 with readable code 14, the default action 532 activates a camera, scanner or other reader (collectively "scanner") connected with the user's electronic device 30. The activated scanner may scan or otherwise read the registered readable code, and mobile device 30 with app 20 transmits the information to the processing center. The processing center 40 reads the transmitted code and implements a default action 5700. See, FIGS. 4, 14.

The programmed action may be to open or close a moveable physical barrier 17, to lift or lower a gate arm 17a, to open or close a vault, to request specific information, complete a transaction, to lock or unlock any lock, to arm or disarm a security system, or complete any other action that may be implemented based on a command sent from a remote location to software at a registered location.

In some embodiments, the registered readable code 14 may be coupled with an individual parking space in a parking facility, or coupled with an individual street parking space, as a non-limiting example, by having a sticker displayed on a parking meter. In some embodiments, each individual parking space is a registered location 10, with geographic information 110 coupled with registered readable code 14. In other embodiments, registered location 10 may comprise a plurality of individual parking spaces, each with a display of registered readable codes, and each coupled with a single registered location 10. As non-limiting examples, within one registered parking facility 10 each parking space may display registered readable code 14; or one side of a street may be a registered location 10 with specific parking rate parameters 120a, and each parking space on that side of the street may display registered readable code 14 coupled with that registered street parking location 10. When an end user with a mobile device with the app is within correspondence distance 551 of registered location 10 and the processing center 40 finds correspondence 550, the default action activates scanner 32. The end user may scan the display of registered readable code 14 coupled with an individual parking spot, and the system may record the exact parking location, in addition to the time the parking session began, and other information.

The mobile device may be a stand-alone device (as a non-limiting example, a mobile phone), or may be permanently connected with a vehicle (as non-limiting examples, a car-phone or integrated circuitry).

In some embodiments, the end user may enter at least one end user payment option. As non-limiting examples, the payment option may be a credit card or a debit card. In some embodiments, a specific method of consumer payment option is linked to a specific registered location, as a non-limiting example, an employer may pay for employees to park in a specific registered parking facility, and the remote processing center will charge the employer when the end user/employee parks in that lot, however the processing center will not charge the employer when the end user parks in other registered lots.

Embodiments of the invention may be used determine a variety of information, including parking availability, real-time inventory of parked vehicles, which vehicles are currently parked, the parking spot of each parked vehicle, the amount of time each vehicle is parked, driving patterns of users, or other information. Some embodiments may be used to reserve a parking space in a designated parking facility.

In some embodiments, the system is a time and/or location-based revenue control systems when one or more of the following are conducted by connection to servers on the internet: (a)(1) computation to determine time elapsed, (a)(2) lookup or computation to determine an applicable rate schedule (a)(3) lookup of user's personal and/or loyalty information, (b) lookup or computation to determine the total payment due, (c) determining a user's payment information, (d) determining a merchant's payment information, (e) creating a payment transaction, (f) confirming entrance authority, (g) confirming exit authority, (h) rejecting entrance authority, (i) rejecting exit authority, (j) issuing commands to effect entrance or exit, (k) logging of data. Special cases of (j) include: printing a ticket, programming an electronic device, raising or lowering a gate arm, opening or closing a gate, locking or unlocking a lock, enabling or disabling an alarm, and enabling or disabling additional physical security measures.

DESCRIPTION OF THE SEVERAL VIEWS

FIG. 14 is a schematic representation of embodiments of the invention.

DETAILED DESCRIPTION OF THE INVENTION

As used in this specification, "electronic device", "mobile device" and "internet-connected device" are used interchangeably and mean the same thing. Non-limiting examples of these devices are mobile phones, tablets, PDAs, hand-held devices, car-phones, computers and any other device that can receive and transmit information via the internet, either wirelessly or through wires. As used in this specification, "geographic information" means any data that identifies the unique physical location of a location, and may include longitude and latitude data generated from global positioning technology.

As used in this specification, a "barrier" may be any moveable, physical barrier that opens and closes, separating one space from another space. As non-limiting examples, the term barrier may include gates, locks, deadbolts, windows, entryways, moveable barriers, gate arms, sliding doors, garage doors, locker doors, cabinet doors, hotel or conference room doors, or any other door, lock, gate or any other moveable physical barrier opens and closes, or locks and unlocks to separate one space from another space.

Figure 1:
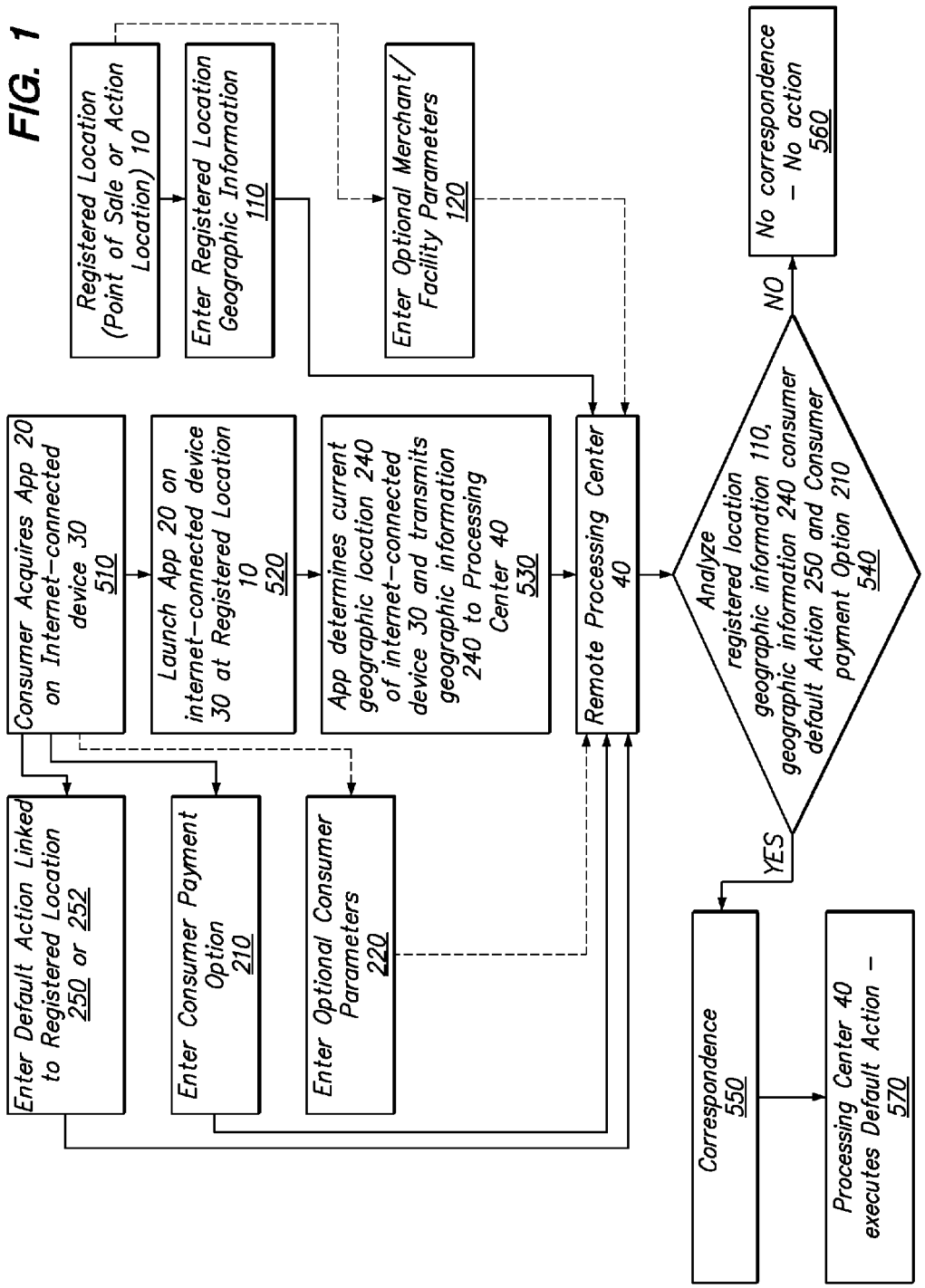
FIG. 1 is a flow diagram of embodiments of the invention when a registered location is a point of sale.
Figure 2:
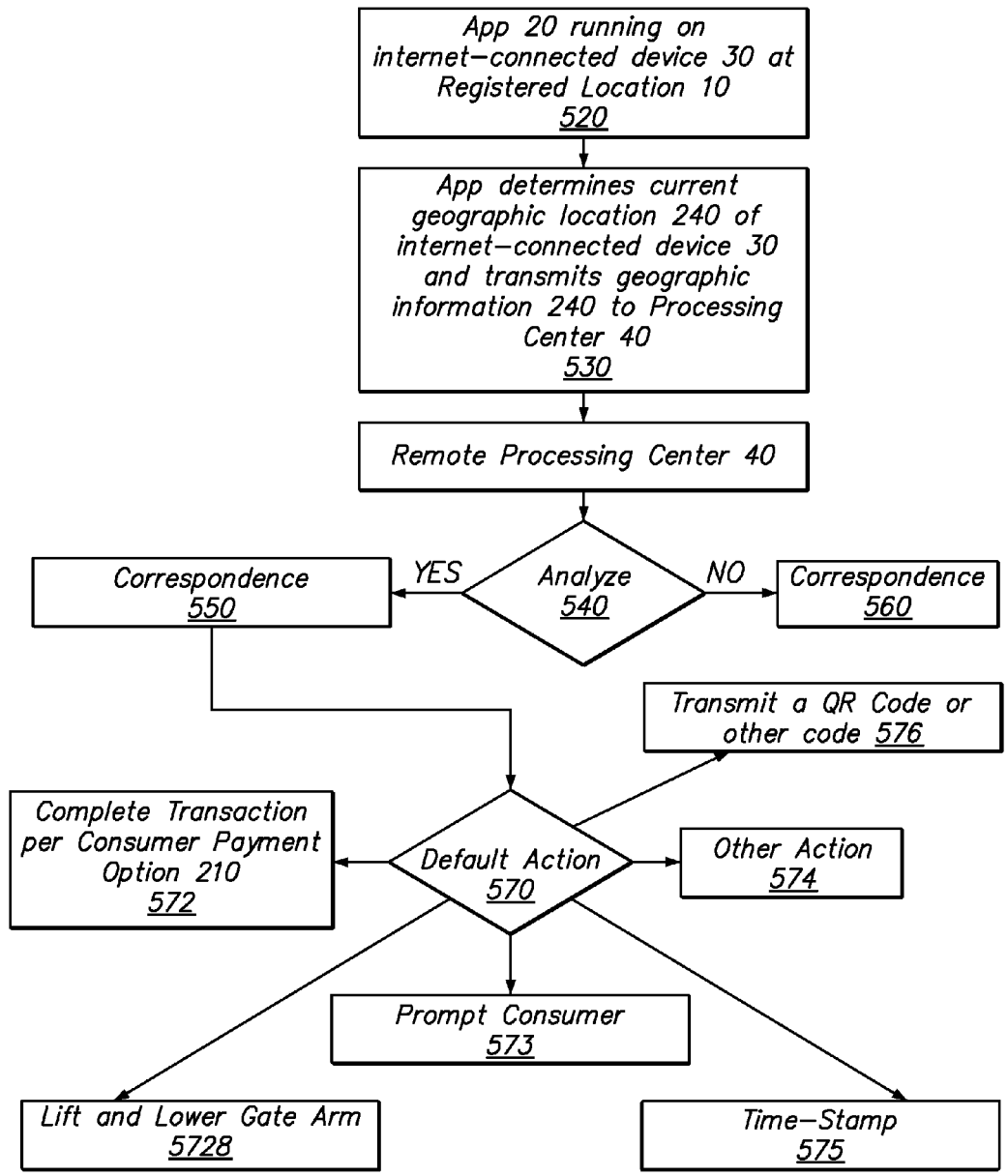
FIG. 2 is a flow diagram of embodiments of the system executing different default actions.
Figure 3:
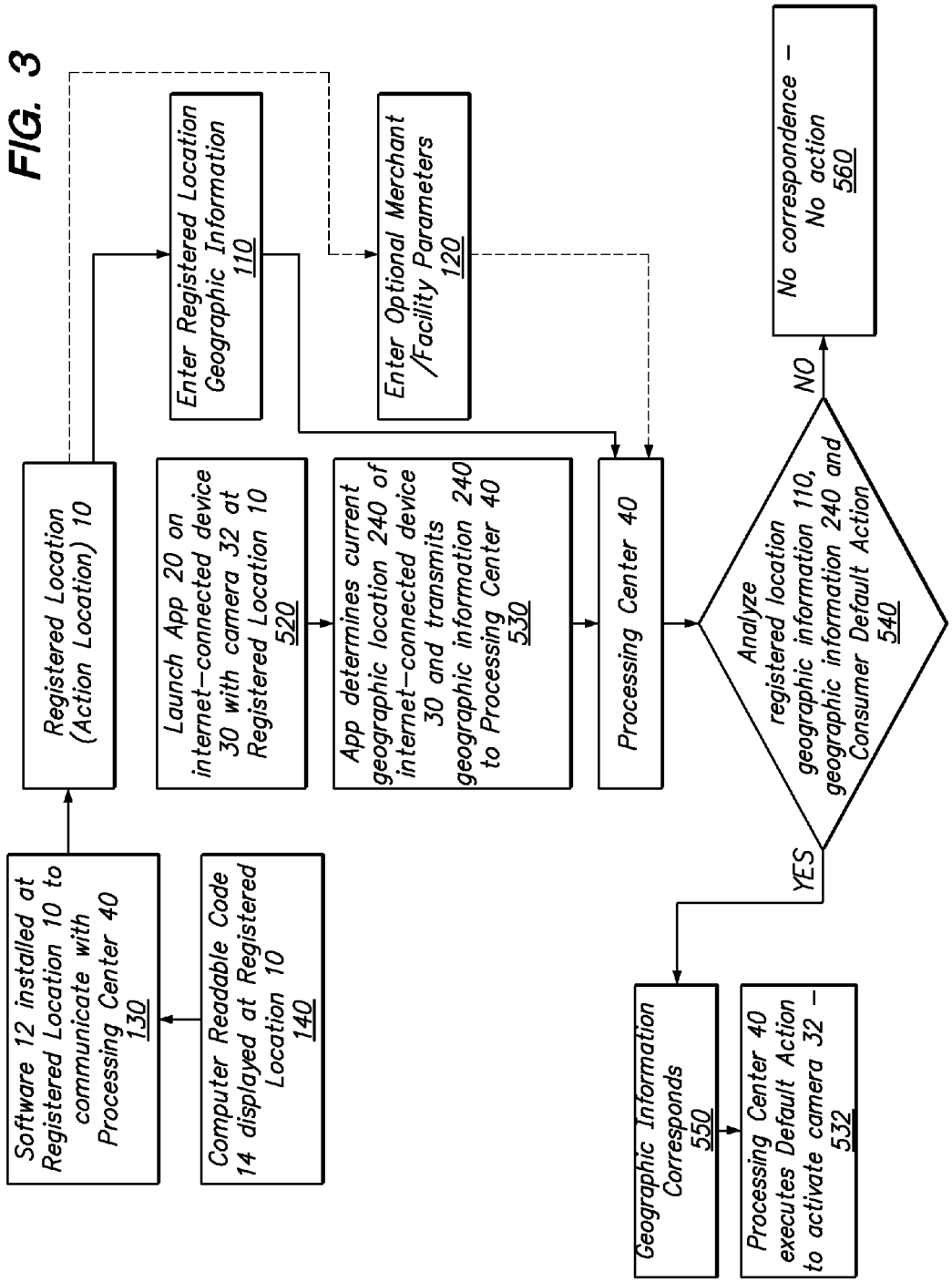
FIG. 3 is a flow diagram of embodiments of the invention when a registered location is an action location.

As shown in FIG. 1, in some embodiments, the physical location 10 of a place of business is registered with the system 110. A registered location 10 may be a point of sale, an action location, or both. In some embodiments, a gate, gate arm, door, or other moveable physical barrier may be an action location.

Figure 4:
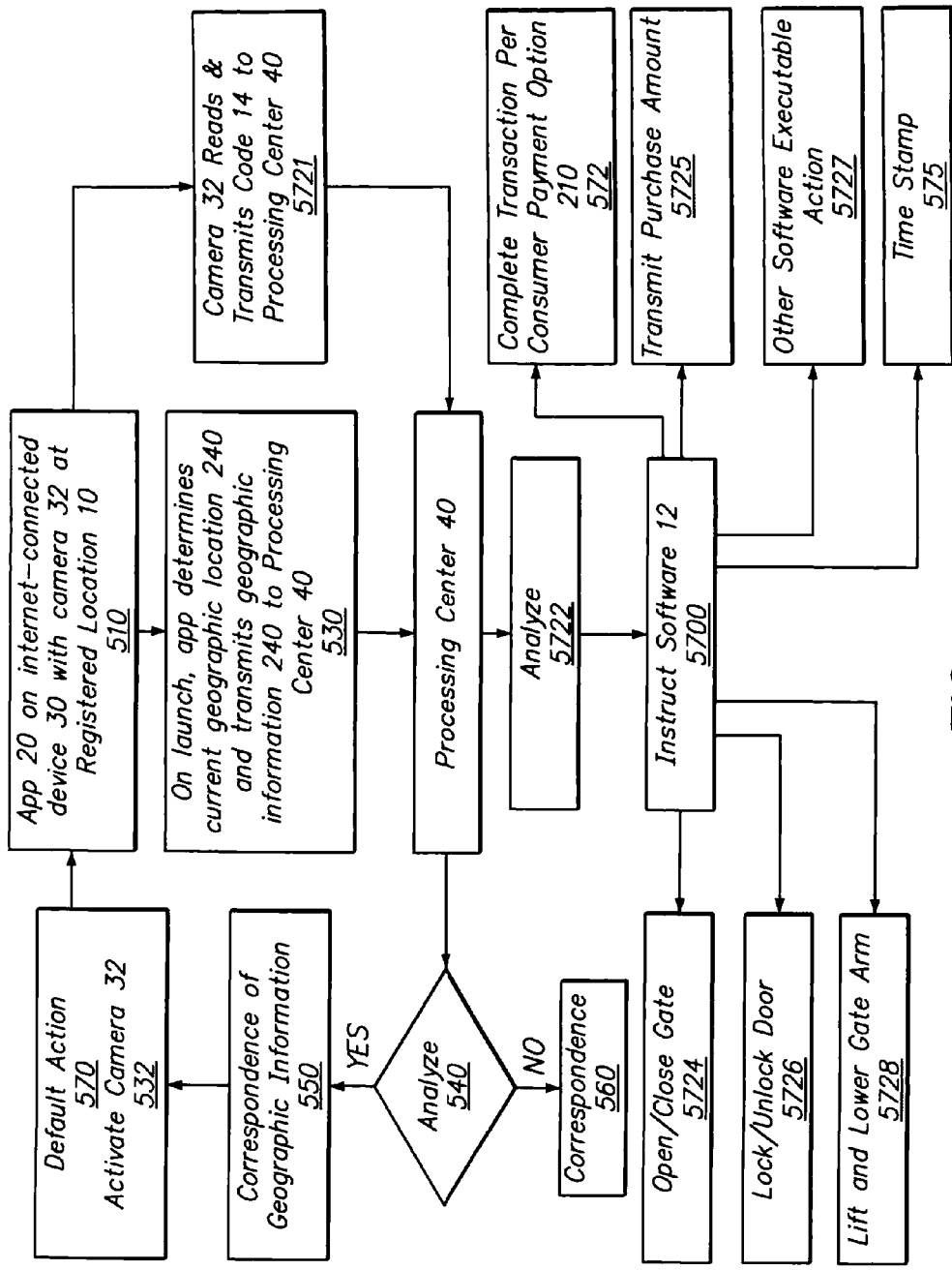
FIG. 4 is a flow diagram of embodiments of system analysis and action when the default action activates a scanner.
Figure 5:
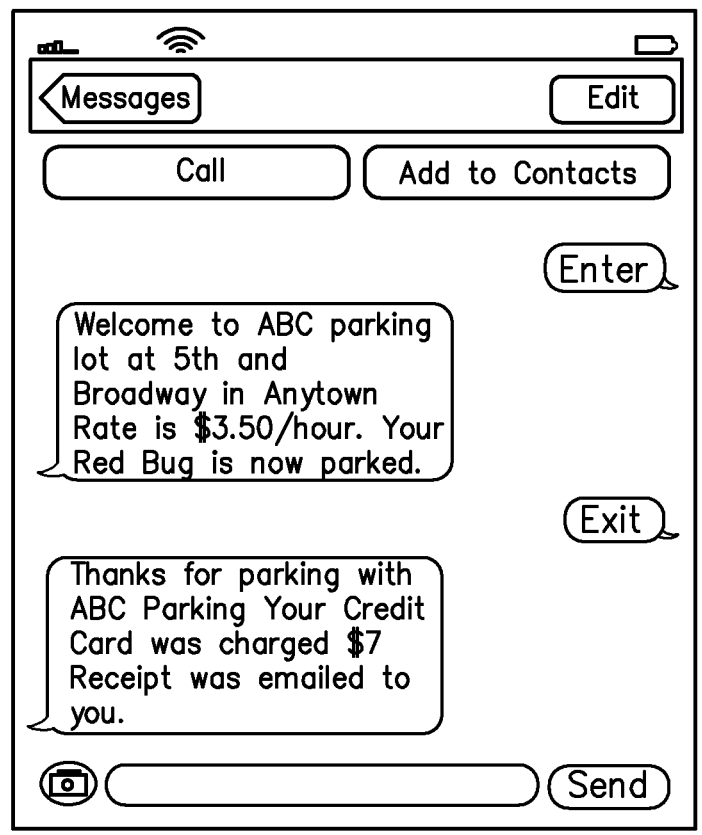
FIG. 5 is a screen shot of an embodiment of the invention, showing payment by text message upon exit.
Figure 16:
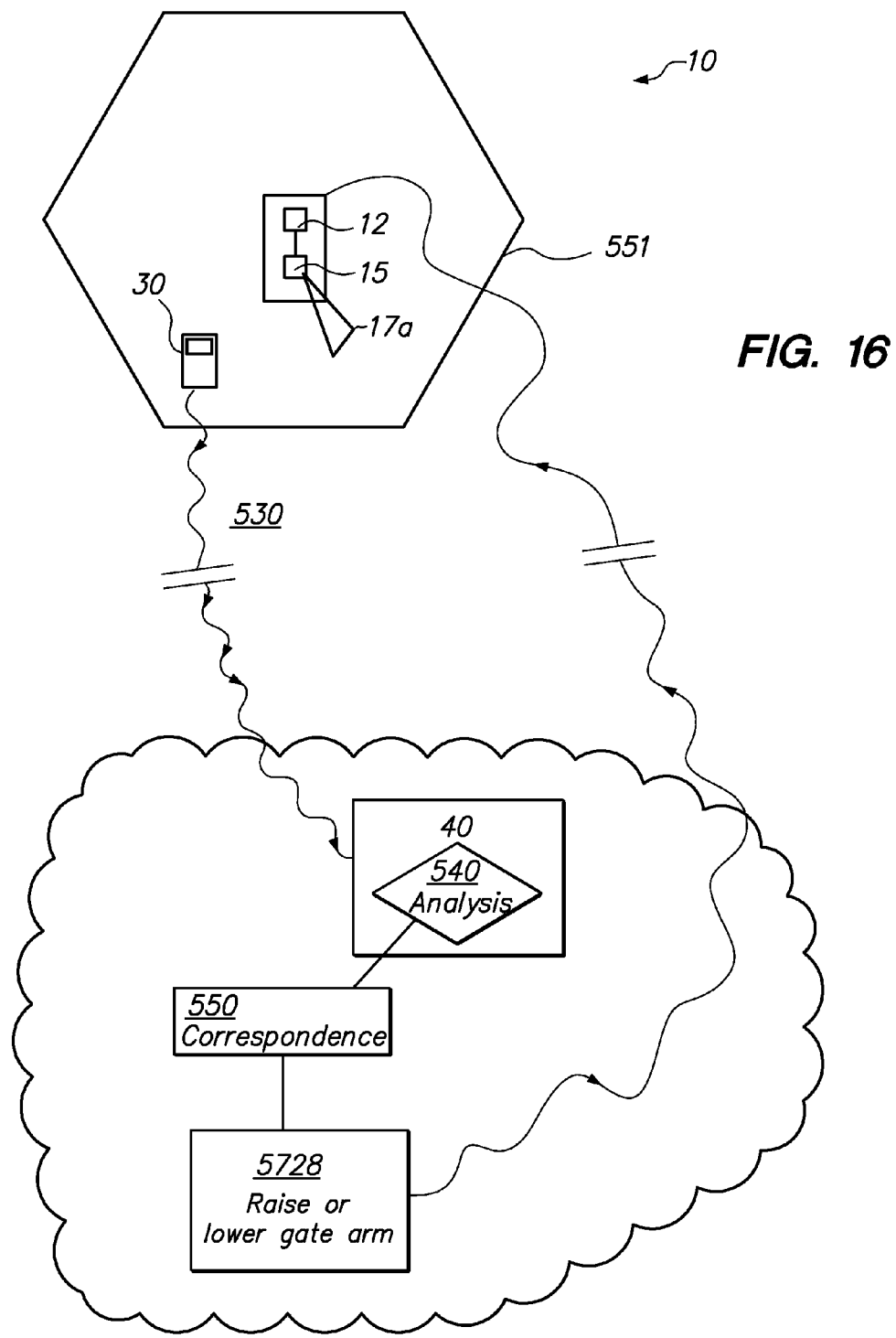
FIG. 16 is a schematic representation of embodiments of the invention.
Figure 17:
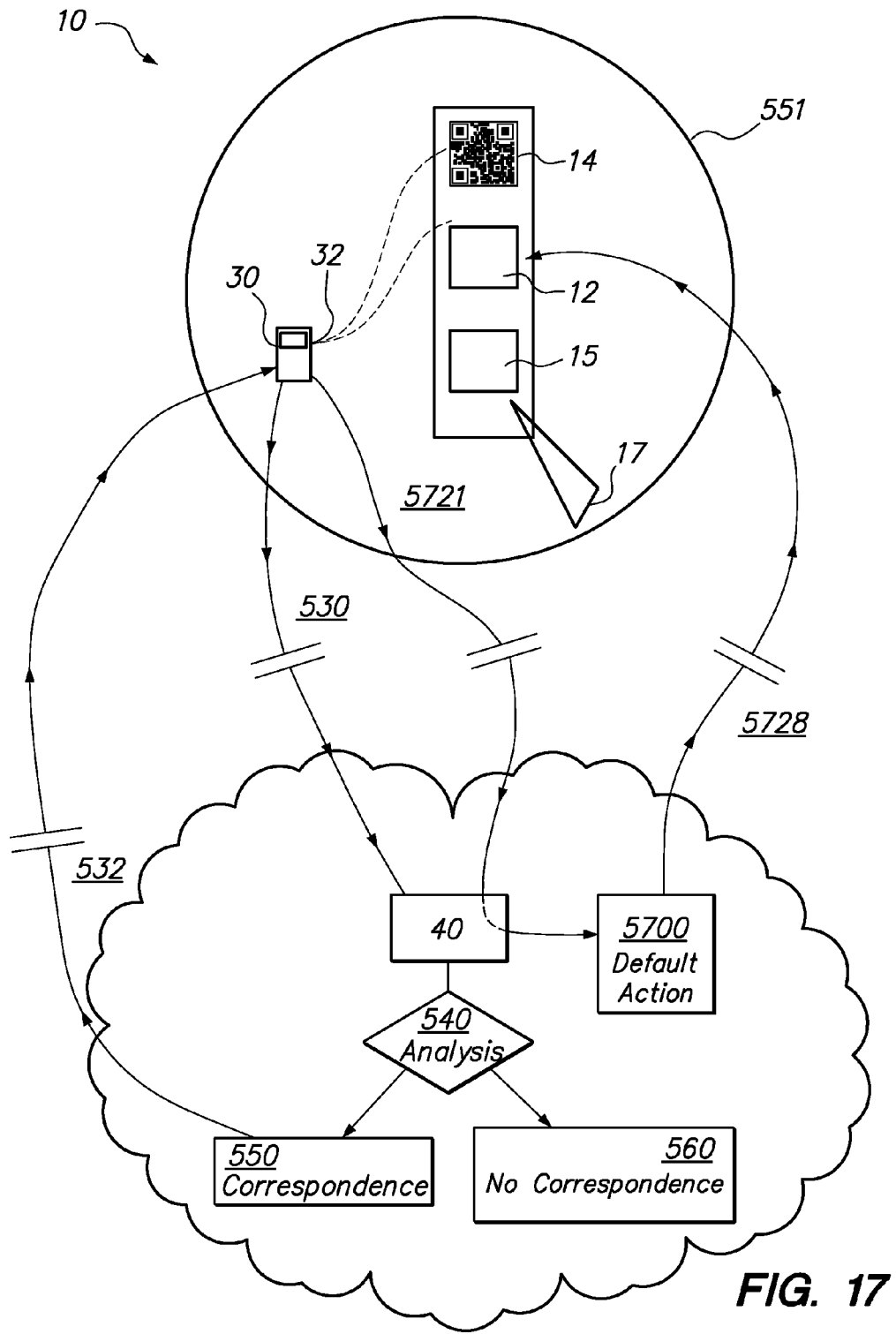
FIG. 17 is a schematic representation of embodiments of the invention.
Figure 18:
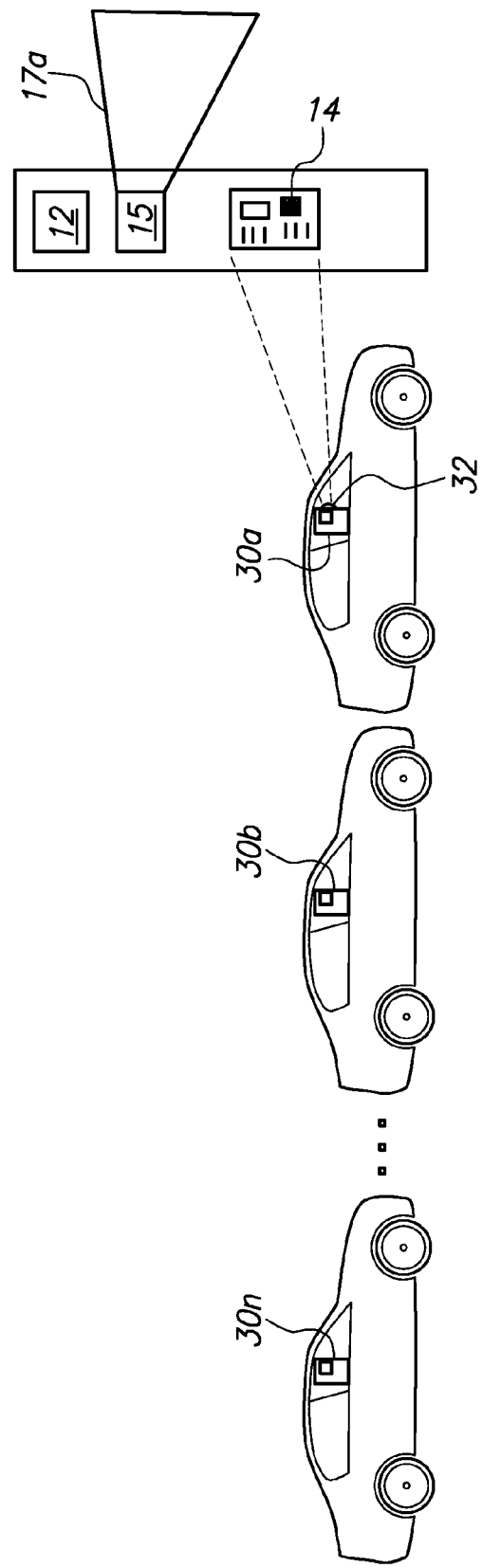
FIG. 18 is a schematic representation of embodiments of the invention.

As shown in FIGS. 4 and 16, an action location may comprise a registered location 10 equipped with software 12 that is in communication with the remote processing center 40, sending and receiving signals from the remote processing center 40. Software 12 is simultaneously in communication with hardware 15 that opens and closes a moveable physical barrier 17, or takes other action.

Registration requires entry of specific data into the processing center, including entry of specific location information 110. Registered location geographic information 110 is any data that identifies the unique physical location of a registered location 10, and may include longitude and latitude data generated from global positioning technology, or may be a correspondence distance or geofence 551. The system allows for numerous registered locations, for a plurality of businesses. The system also allows for a plurality of registered locations at a single place of business, as non-limiting examples, multiple unique cash registers at a single store, or registered locations for different types of sales at a single cash register, or for a plurality of registered locations, each representing for example an individual parking space.

Registration can occur in any number of ways, including data entry via a mobile phone, computer or other internet-connected device, whether wired or wireless.

In one embodiment, the provider, merchant, or system operator may register geographic information 110 with the system by entering the information into a computer connected with the processing center 40. In another embodiment, the provider may be physically at the facility to register. The facility provider may access the back-office feature of the system through an electronic device 30. The system may show a detailed map on the electronic device, with a mark to show the exact location of the electronic device, using geographic location technology. The owner may stand at the entrance of the facility, and upon activation, the invention will determine the exact location of the entrance of the facility, and locate the entrance on a map, as designated by a mark on the map.

Figure 6:
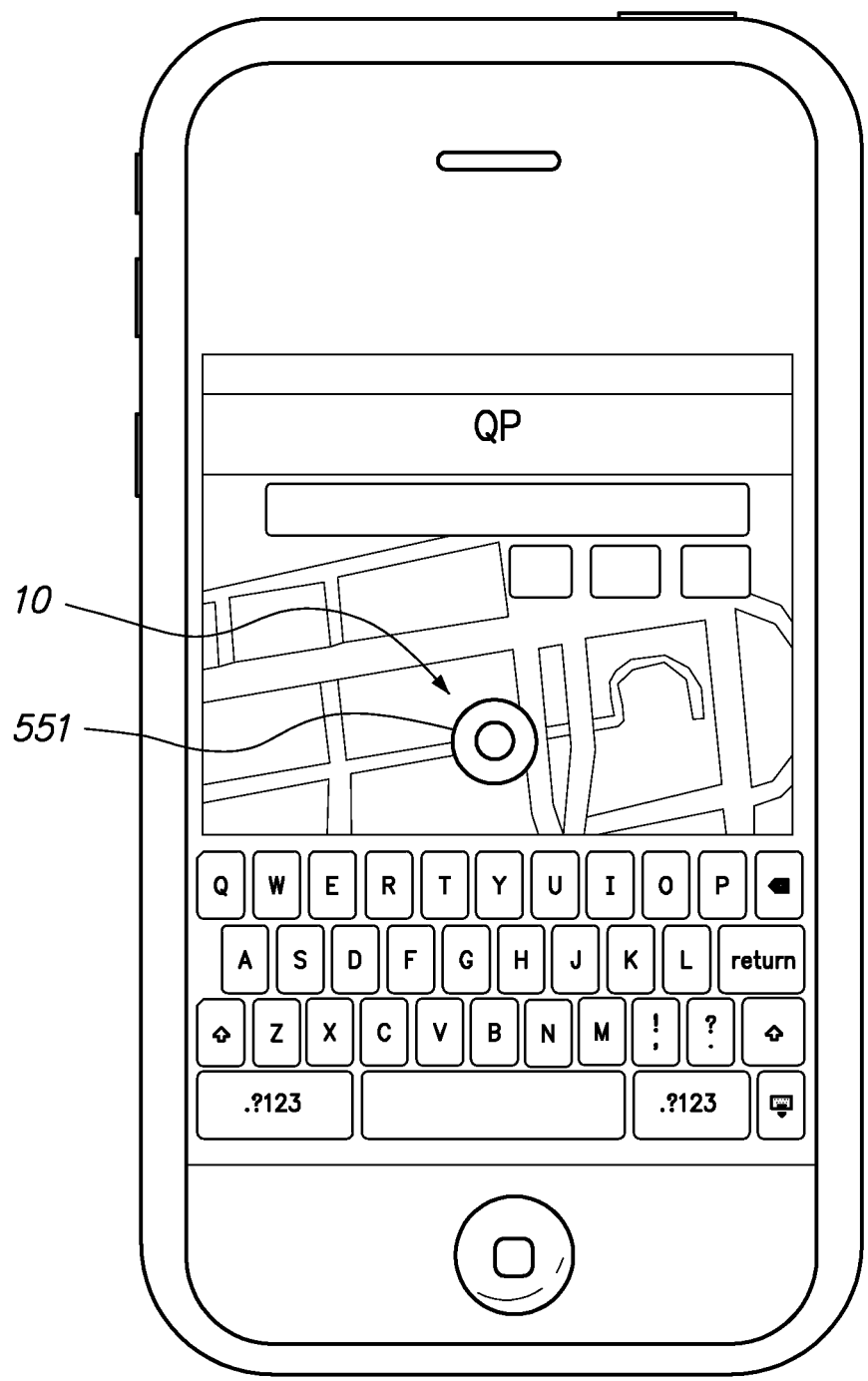
FIG. 6 is a screen shot of an embodiment of the invention, with a circle on a map identifying a registered location.
Figure 7:
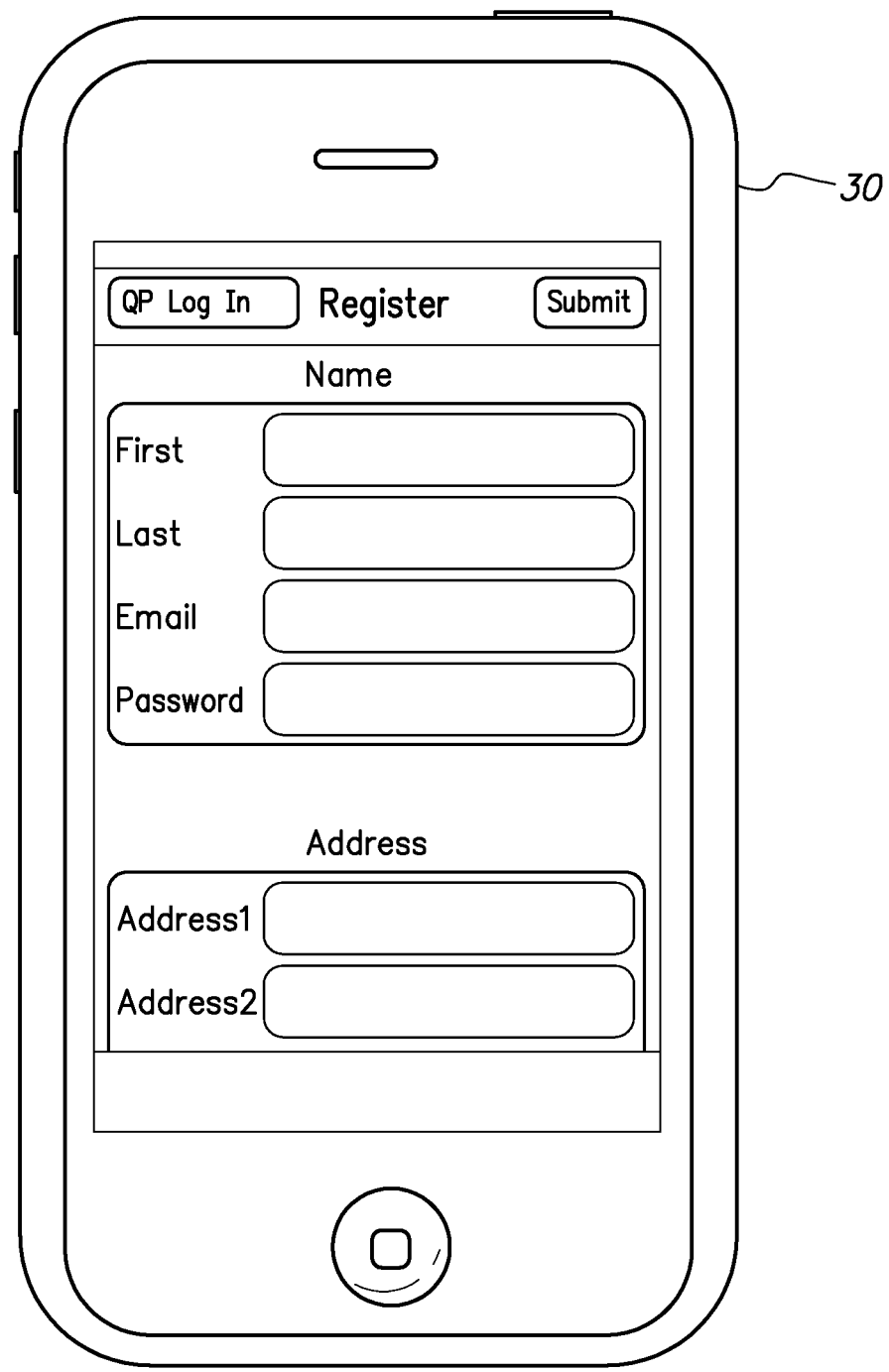
FIG. 7 is a screen shot of an embodiment of the invention, allowing a user to enter user data.
Figure 8:
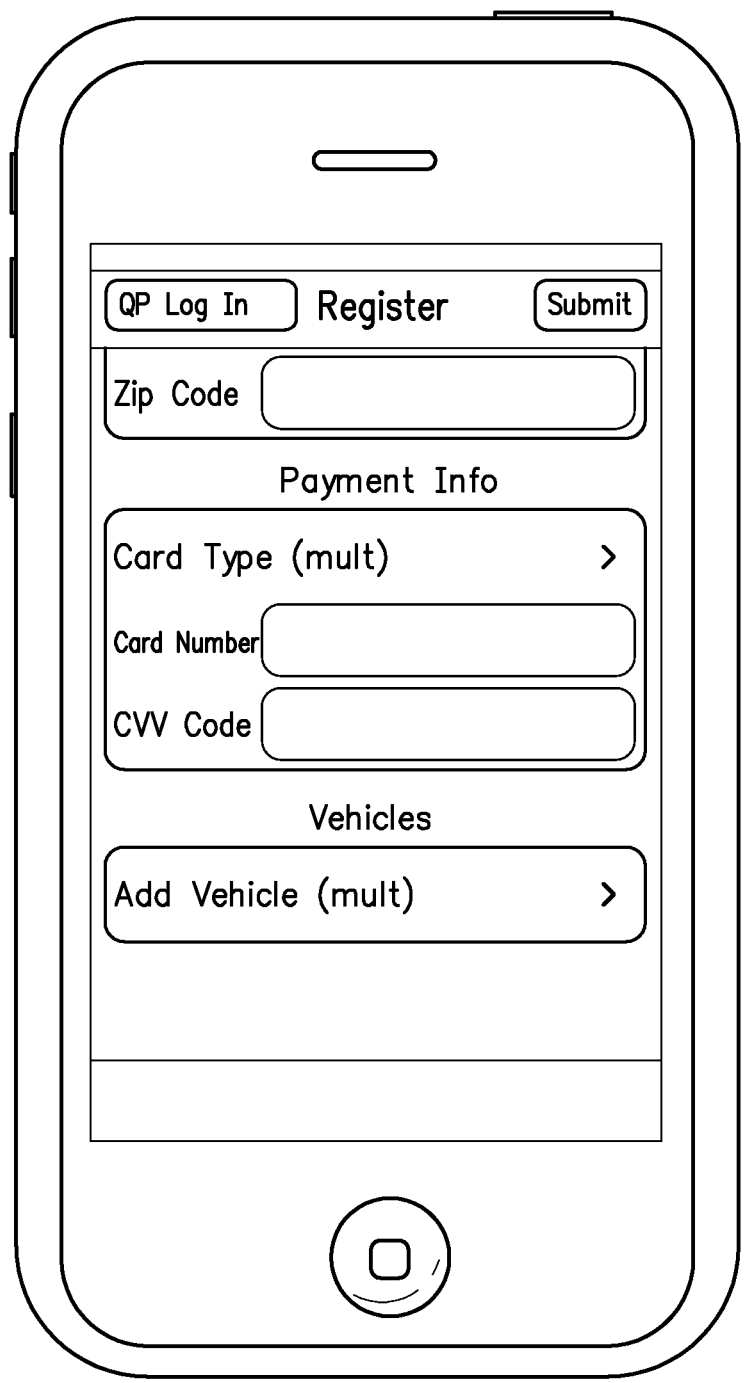
FIG. 8 is a screen shot of an embodiment of the invention, allowing a user to enter payment data and vehicle information.

In one embodiment, the system will prompt the owner/provider to enter the name of the facility, and if desired, a special mark that is specifically linked to that particular facility. FIG. 6 shows an exemplar screen that will appear to a parking provider, allowing the provider to enter the name of the parking facility, and to press a button on the screen to set the physical location of the entrance of the parking facility, and thereby create a registered parking facility.

Registration may also include entry of any other merchant or owner parameters 120, as needed. A merchant or owner parameter 120 may include a fee structure 120a, permitted times of access 120b, the type of business 120c, a list of approved customers 120d, coupons, special rates, personalized rates, or other loyalty program 120e, or any other variable 120f, information or parameters that may be desired. The rate structure 120a may be of any type, as non-limiting examples, incremental timed rates, flat fee rates, validated parking rates, special event rates, rates paid by third-parties, a unique rate structure for each individual space, for example a unique rate for a single parking space on the street or in a parking facility, a rate based on parking usage, a maximum transaction amount, daily, hourly, fraction of hour, or monthly rates, rates based on time of day, day of week, or any combination thereof. The fee rate 120a may be set in any currency desired. In the United States, this will generally be dollars and cents.

After a facility is registered, a facility owner, or other designated person may access the system through an electronic device or computer, and may enter or change the fee structure 120a or any other owner parameter 120 for each designated parking facility.

A registered location 10 is created once geographic information 110 and optional rate structure 120a of a facility are entered with the system, end users may use the system to pay for goods or services at that registered location 10 through the app 20.

The user may acquire 510 the app in any way. As non-limiting examples, a user may acquire the app by downloading the app to a mobile phone or to any other internet-connected device, or may acquire the app through CDs, or any other way to transfer software.

After a user has acquired the app, the user may enter at least one payment option 210 and user parameters 220. The end user's payment option 210 and user parameters 220 are associated with the user's mobile device and are stored in the central processor 40. See FIG. 1.

A payment option 210 includes any payment method. As non-limiting examples, the payment option may be a credit card, a debit card, a gift card, other bank card 210a; a bank account or online payment option 210b; validated payment credit, coupons, or payments by third-parties including but not limited to employers 210c; the use of checks 210d; cash 210e; or other payment method 210f. The processing center may, in many instances, use a third party to complete the debit, credit or other payment transactions. See, FIG. 14.

In some embodiments, a specific consumer payment option 210 and/or other user parameters are linked to a specific registered location 10. In some embodiments, the user may enter a specific credit or debit card to pay for a specific transaction. In another, non-limiting embodiment, an employer may pay for employees to park in a specific registered parking facility 10, and the remote processing center 40 will charge the employer when the end user/employee parks in that lot, however the processing center will not charge the employer when the end user parks in other registered lots.

The user may enter various user parameters 220, as needed or desired. As one non-limiting example, user parameters may be vehicle identification information 220a and may include one, some or all of the following: make, model, year, license plate number, color or any other information. The user's mobile device becomes associated with at least one vehicle when the end user enters user parameters describing that vehicle, and this information is stored in the central processor 40. See FIG. 1. The user information may be varied, as desired, at any time. As a non-limiting example, the user may have more than one vehicle, and each vehicle may be entered and associated with the end user's mobile internet connected device. In other instances, the user may have a rental car, or be a passenger in someone else's vehicle.

User parameters 220 may be specific to each registered location. In these embodiments, a user may set different parameters for different businesses or locations. As non-limiting examples, a user may set a maximum purchase amount at a specific location; may limit the days that payments may be processed at a specific registered location; or may enter a first payment option linked to a specific registered location, and a second payment option linked to a second registered location.

In some embodiments, user parameters may be specific to general types of businesses so that the same user parameters are used when the user is at any registered location of a specific type of business. As non-limiting examples, specific types of businesses may comprise parking facilities, hotels, gas stations, marinas, airports, storage spaces, lockers, game spaces, or amusement parks.

In other embodiments, the user's mobile device is associated with user parameters comprising identifying information 220b for a boat, airplane, or any other machine or device. In these instances, user parameters 220b comprise information identifying a boat, airplane, or other machine or device. Additional user parameters may comprise user identification information 220c; approved registered locations 220d; a maximum purchase amount or a other transaction information 220e; and any other information, variable or parameter 220f that may be desired. In some embodiments, the app 20 may prompt the user for information 220, prior to first use, or during the use of the app 20. See, FIG. 14.

Figure 15:
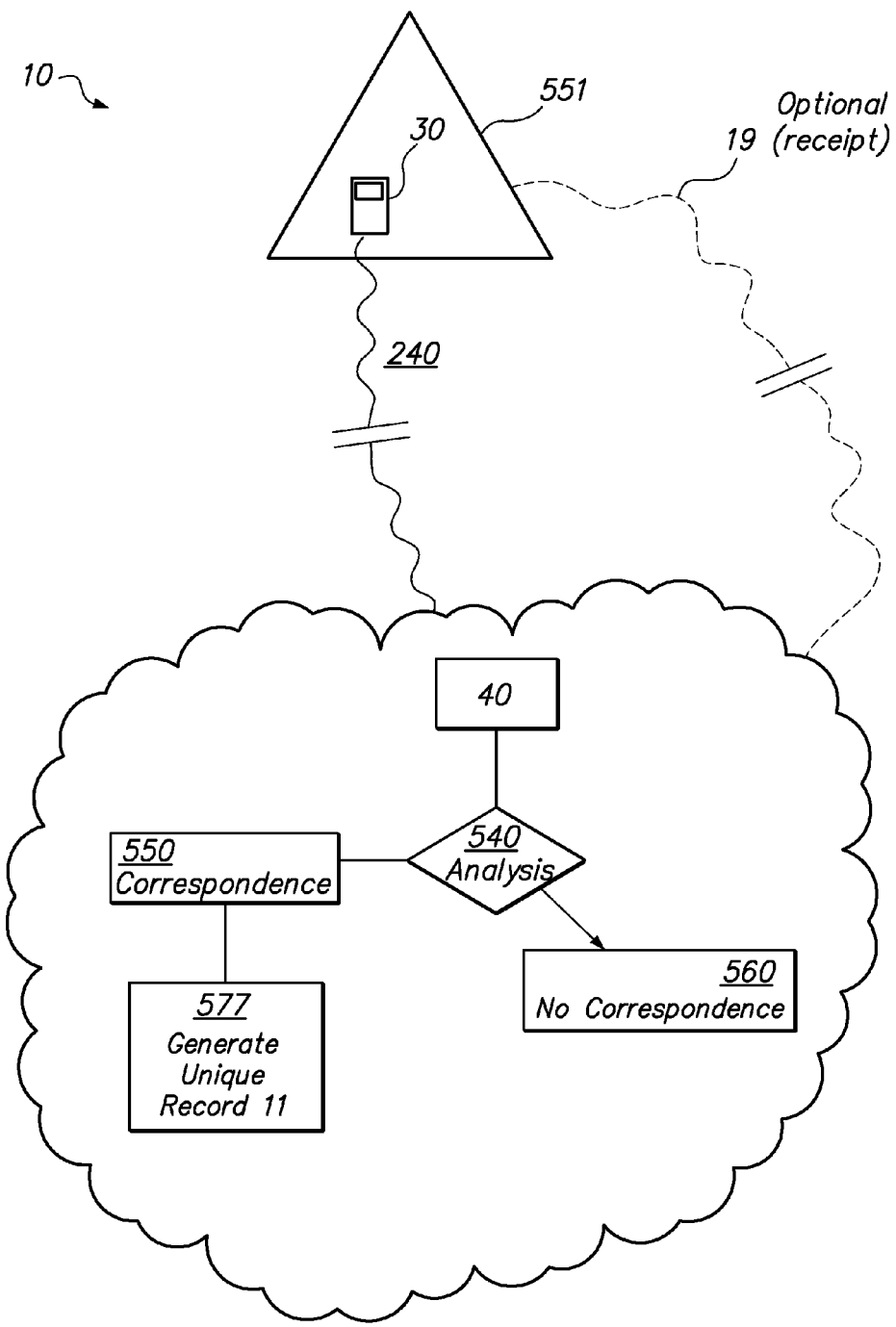
FIG. 15 is a schematic representation of embodiments of the invention.

App 20 transmits information associated with the user's electronic device 30 to the cloud via the internet to the remote communication devices, including orbiting satellites, communication towers, and other equipment used for wireless communications. See FIG. 15. These remote communication devices are not at the point of sale or action location; they are remote from the registered location 10. The information may then be relayed from these remote communication devices to the remote processing center 40. See FIGS. 1, 2, 3 and 4. In these embodiments, when an associated mobile device with the app 20 is running or open at a registered location 10, and the relevant parameters correspond 550, the merchant does not need any device to receive or send information, and there is no need for input or entry by the merchant. In these embodiments, launching or running the app 20 at a registered location 10 completes the transaction.

Correspondence 550 is determined through analysis 540 by processing center 40 of geographic location information 240 received from the user's electronic device 30. Processing center 40 will find correspondence 550 when the transmitted geographic information 240 is within the correspondence distance or geofence 551 of a registered location 10.

The correspondence distance or geofence 551 of registered location 10 may be in any shape and may be as specific as needed. As a non-limiting example, the geofence 551 may identify and distinguish individual parking spaces, whether on the street or in single level or multi-level parking facility. In these embodiments, each parking spot may be a unique registered location 10. In other embodiments, the correspondence distance or geofence 551 may be the exact shape of a registered location, whether that shape is square, rectangle, triangle, circle, ellipse, polygon, or any other shape. See e.g. FIGS. 6, 13 and 15-18. The geofence 551 may be three-dimensional, as a non-limiting example, a multi-level parking facility. Correspondence distance or geofence 551 may be a specific as needed to distinguish individual cash registers among a plurality of cash registers inside a single business. It is apparent that the shape and size of the geofence or correspondence distance 551 may be as accurate as the technology allows.

In other embodiments, the mobile phone of an end user defines a mobile geo-fence. When the geofence of surrounding a registered mobile device intersects with the geofence of a registered location, the system may permit a variety of default actions, including but not limited to paying for parking, opening and/or closing any moveable physical barrier, granting access, locking and/or unlocking any barrier.

In some embodiments, a registered location 10 may comprise a mobile location with software that transmits the current, mobile geographic location. A processing center associates a geo-fence 551 with the mobile location. The geo-fence may be any size needed. As a non-limiting example, a taxi may be a registered mobile location, and the size of the geo-fence 551 may be the size of the taxi cab. Software connected with the taxi transmits the taxi's current geographic location to the processing center. When a registered end user with the app enters the mobile geo-fence 551, the default action may be to time stamp 575 and begin a taxi cab fare ticket. In other embodiments, when the geographic information 240 from an end user's mobile device enters a taxi's mobile geo-fence 551, the default action may be to query the end user about a taxi ride destination, or any other query needed to begin a taxi trip.

As another non-limited example, boat, airplane or a food truck may be a mobile registered location. A registered mobile location is not limited to vehicles. A registered mobile location comprises any mobile device capable of emitting a geo-fence for which registered location information 120 and a default action, 570 or 5700, has been entered into processing center 40. In these embodiments, the app 20 and processing center 40 communicate to execute the desired default action, 570 or 5700. In some instances, the default action may be to start a time-stamp and/or begin a fare calculation. In other instances, the default action may be to order food item from a food truck.

The app 20 transmits to the processing center 40 the current geographic location 240 of the associated electronic device 30 using positioning technology that is known to those skilled in the art, as a non-limiting example GPS (Global Position System).

A default action 570 is linked 250 to each registered location, or type of registered location, by either the system or the user. A default action 570 is an action implemented by the processing center 40 after finding correspondence 550 between geographic information 240 and 110. The default action may be a single and final action, or it may be the first in a series of actions. See, FIGS. 2, 4 and 17. The default action may be any action where the processing center can effect action 574, either directly within the processing center itself, through communication with software 12, or through communication with third party payment processing centers.

In some embodiments a default action 570 comprises charging the end user payment option 210 when the user's associated mobile device 30 is at a specific registered facility 10. A non-limiting instance comprises paying for parking at a registered parking facility 10 with a flat fee parking rate structure 120*a*. In this embodiment, when a user with an associated mobile device 30 drives to a registered parking facility 10 and enters geofence 551, the system automatically charges the end user's payment option 210 the flat fee according to parking rate structure 120*a*. The processing center analyzes 540 the geographic information 110 of the registered parking facility 10 and the geographic information 240 transmitted from the user's electronic device 30. When analysis finds correspondence 550, the processing center 40 executes the default action 572 to charge the flat fee 120*a* to the user's payment option 210.

No action is taken if the geographic information does not correspond 560, or if there is no user payment/information associated with the user electronic device. See FIGS. 1 and 2.

In other parking embodiments, when there is correspondence 550, a default action 570 or 5700 may also generate 577 a unique parking session record 11 and transmit 5725 confirmation receipt 19 to the parking facility operator. The unique parking session record 11 associates the identifying information of the vehicle 220*a* and mobile device 30 with that registered parking facility 10. The system may send a confirmation message 19 with any or all of this information to the parking facility operator, and the operator may use this information to verify that all parked vehicles have paid to park. The system may also send a confirmation receipt 19 to the end user, with some or all of this information. See FIG. 15.

Figure 11:
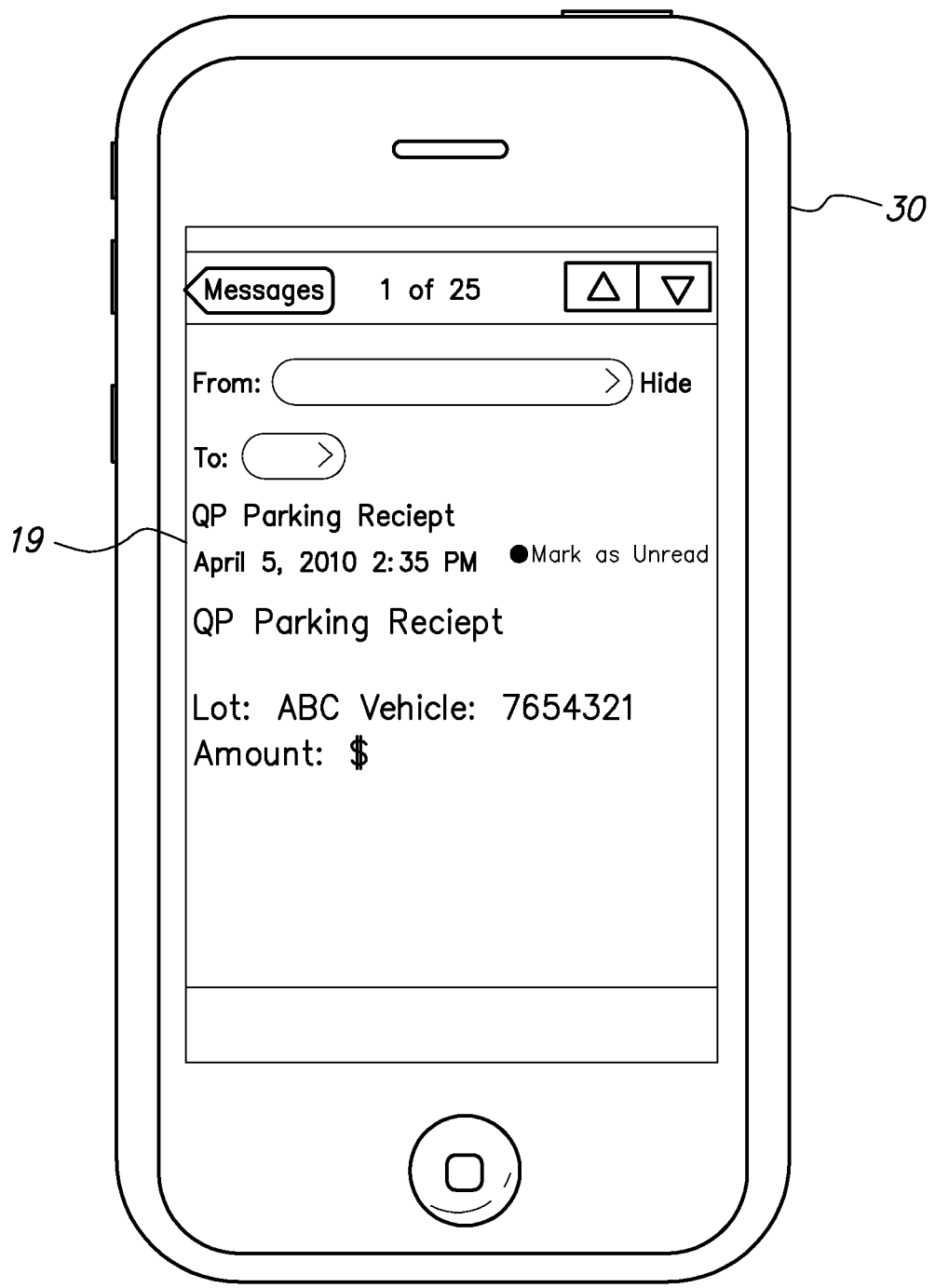
FIG. 11 is a screen shot of an embodiment of the invention, showing another receipt or confirmation message.
Figure 12:
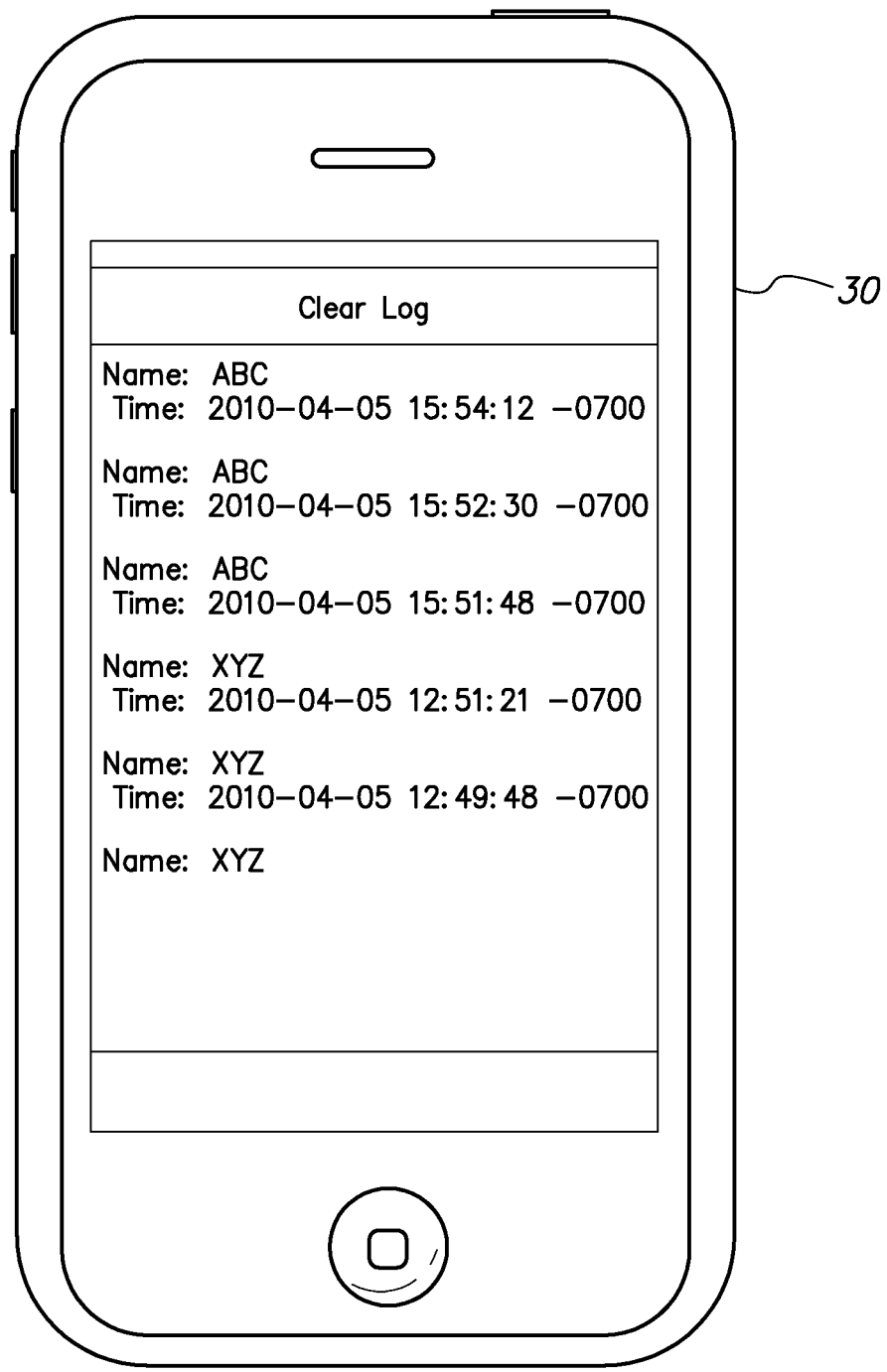
FIG. 12 is a screen shot of an embodiment of the invention, showing a real-time log of parked vehicles.
Figure 13:
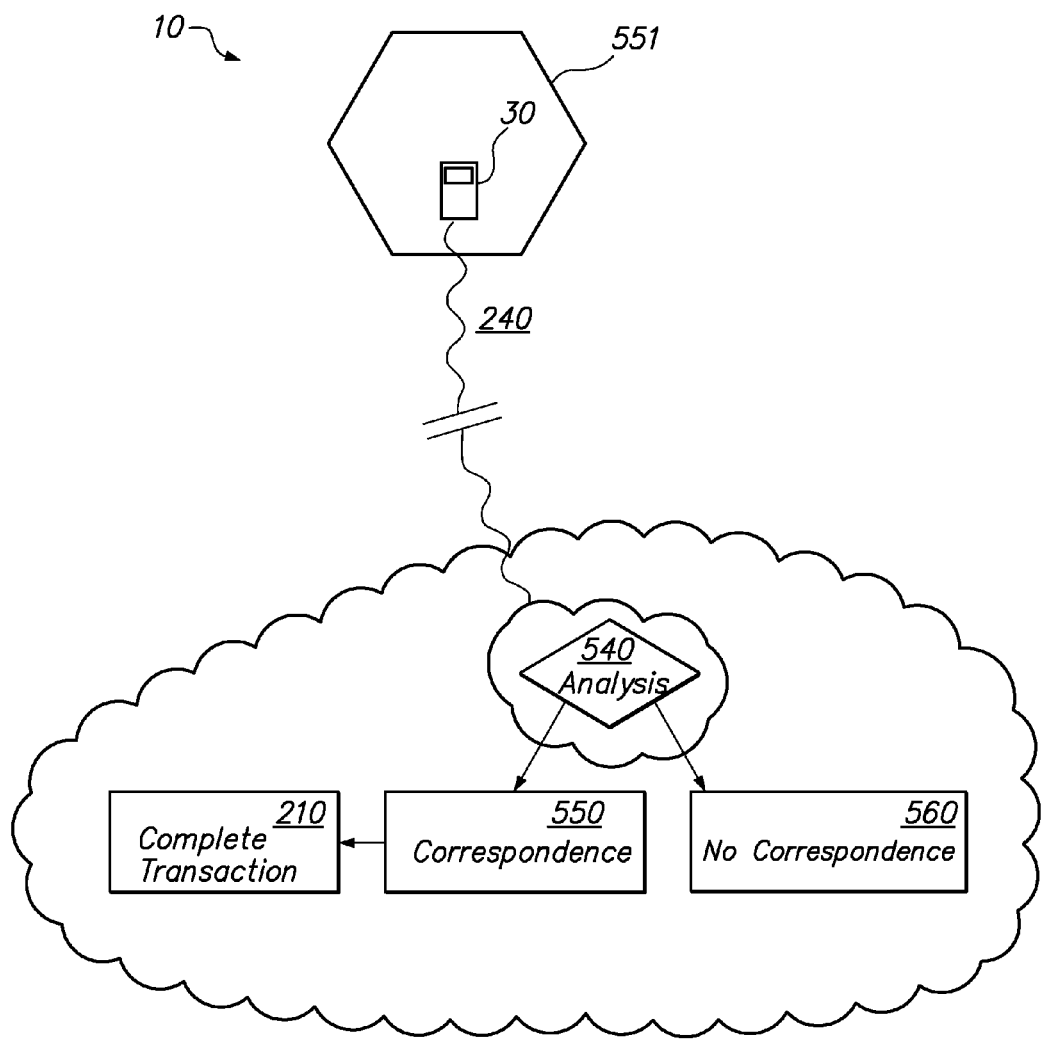
FIG. 13 is a schematic representation of an embodiment of the invention, showing geo-based entrance to a registered location.

The confirming message 19 may be an email, text message or instant message, or any other form of communication of real-time information regarding the status of registered vehicles, as shown in FIGS. 11 and 12.

The system is not limited to parking facilities. Embodiments may function in a similar manner in any instance where the fee 120*a* is a flat rate, whether this flat rate is an entrance fee or any other flat rate fee. In these embodiments, default action 572 completes the flat fee transaction when processing center 40 analysis 540 finds correspondence 550 between geographic information 240 transmitted from an associated mobile device 30 and geographic information 110 of a registered location 10. See FIGS. 2 and 14. As non-limiting examples of flat rate entrance fees, the system may be used at a gym, airport, marina, hotel, game space, amusement park, movie theater or other space that has a flat entrance fee.

As a non-limiting example, a boat captain may set the app to pay entrance, docking or slip fees at registered marinas. The captain may enter boat identification information 220*b*, which is transmitted and stored by the remote processing center 40. The processing center associates the boat identification information 220*b* with the captain's mobile device 30. App 20 transmits geographic information 240 of the associated mobile device and boat to processing center 40. When processing center 40 finds correspondence 550 between the transmitted geographic information 240 and geographic information 110 of a registered marina, the default action 570 may be to charge the captain's payment option 210 a fee, and generate a session record 11. Confirming receipt 19 may be sent to the marina operator and/or boat captain, so the parties have a record and can verify that this boat has paid the required fee.

Likewise, and as another non-limiting example, a pilot (or other user) may use the app 20 in a similar manner to pay airport landing and/or takeoff fees at any airport that is a registered location 10.

A default action 570 may be entered by the end user 250, or by the system operator 252. A default action may be to purchase a specific item at a registered location 10, where that item may have a standard price or may have a variable price. As a non-limiting example, in this instance, the consumer may link 250 a default action to purchase 10 gallons of gas at registered gas stations 10. Upon launching or running the app at a registered gas station, and upon finding correspondence 550 of geographic information 240 and 110, processing center 40 will execute default action 572 to charge the user for the 10 gallons, even if the price per gallon varies.

Non-limiting examples of other default actions 570 may be to time-stamp, or start the timer on payment of a fee based on increments of time 575, to lift or lower a gate arm 5728, to activate a scanner 532, or any combination thereof. A non-limiting example of a combination is to time-stamp and raise/lower a gate arm when a user launches the app 20. See FIGS. 2 and 3. Another non-limiting example is to time-stamp and open a unique session record 11.

Figure 9:
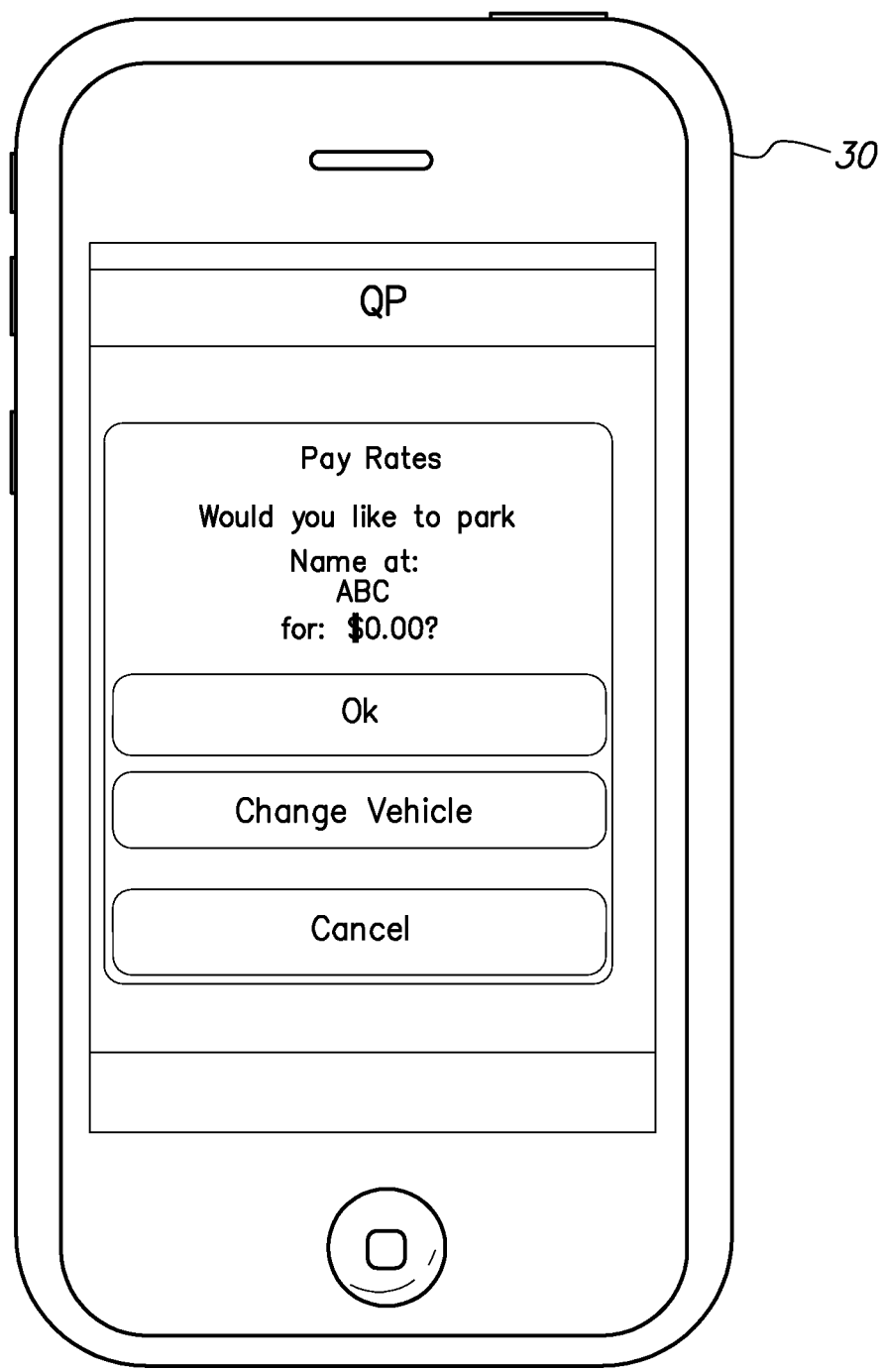
FIG. 9 is a screen shot of an embodiment of the invention, sending a query to the user.

A default action may be the first action in a series of actions. As a non-limiting example, the default action may comprise transmitting a query, question, or other prompt 573 back to the user's associated electronic device 30, viewable on the screen 31. FIG. 9 shows one non-limiting example of a screen that prompts a user for the above-described information. As non-limiting examples of a question, prompt or query 573 the processing center may ask the user to enter an amount of payment 573*a*, confirm a payment amount 573*b*, confirm the physical location 573*c*, confirm user identifying information 573*d*, confirm vehicle, boat or plane identification 573*e*, confirm purchase item 573*f*, to confirm that the user wishes to park, dock or land at the specific registered facility 573*g*, and/or any other prompt or question that is needed or wanted.

One default action may be to access a localized WiFi network. In this embodiment, upon launch of the app at a registered location, and upon the processing center finding correspondence of geographic information, the user's electronic device may be automatically linked to a specific WiFi network associated with and connected with the registered location.

The WiFi network may be accessible only to, and dedicated only to, users with electronic devices containing the app.

In this embodiment, when the processing center finds geographic correspondence with the user's mobile device with app, the user is granted access the localized WiFi. The user may access the localized (and optionally dedicated) WiFi network to implement other actions. This localized (and dedicated) WiFi may optionally be in a parking facility that previously was unable to access the interne due to physical location, structural impediments. or other unavailability of internet access. In other embodiments the localized WiFi may be at a marina or airport. The registered facility may or may not have previously had internet access or WiFi. In these embodiments, the localized WiFi is accessibly when the user launches or is running the app. The user, and facility operator may communicate with each other, and to the interne generally, by accessing the localized WiFi.

User access to the localized WiFi allows the user to connect with partner locations. Partner locations are locations that are partnered with the system. Partner locations may also be registered locations. As a non-limiting example, a partner location may be a coffee shop that is close to a registered parking facility. When a user launches or is running the app at a registered parking facility, the processing center will locate nearby partner locations, including the partner coffee shop. The user may place an order with the partner location, and the partner location may deliver the items to the user, at the location of the user's geological signature. Or, the user may choose to walk to the partner location and pick up the item.

The user may program the system, so that the partner location will automatically receive the user's order when the user launches the app. In this embodiment, as a non-limiting example, when a worker arrives in the morning at a registered parking facility, and launches or is running the app, the system may time-stamp the start of an incremental parking fee timer, raise a gate arm allowing the user's vehicle to enter the parking facility, and grant the worker access to the localized WiFi. When the worker has parked his vehicle, the electronic device may send a geo-chrono signal to the localized WiFi, accurately located the vehicle in three-dimensional space within the garage. If so programmed, the system may automatically place an order with a partner location for the worker's morning coffee and pastry. The worker may stay in the vehicle, accessing the interne through the localized WiFi, and wait for the partner location to deliver his coffee and pastry to the location defined by the geo-chrono signature from the electronic device.

The user may program a link between a specific partner location and a specific registered parking facility. As a non-limiting example, a user may program a link between a partner coffee shop that is nearby, and the registered parking facility. The user arrives at the registered parking facility and launches the app, accessing the localized WiFi. The localized WiFi is in communication with the partner coffee shop, through the system. Based on the geo-chrono signature of the user, the system sends a signal to the partnered coffee shop, placing an order for the user. The user order may be pre-programmed, or the user may program and submit a specific order. The partner coffee shop receives the user order, and the geo-chrono signature of the user. The partner location prepares the requested user order. The partner location may deliver the order to the geographic location of the user, or the user may go to the partner location to pick up the order.

The geographic location of the user is as specific as needed to identify each unique user. The localized WiFi may optionally be used to identify each unique parking space, or other geographic location of an end user, and may be as specific as needed to distinguish each user's electronic device. As a non-limiting example, parking facilities may be on one level, or may have more than one level. Single level parking facilities have all vehicles on one level, as a non-limiting example, a parking facility with a plurality of parking spaces at street level. Some parking facilities have multiple levels, and vehicles may be at different heights or depths from street level (above or below street level). Some parking facilities may use specialized equipment to stack vehicles on top of each other, on a single level of a parking facility. In any of these parking facilities, the localized WiFi may be used to identify the precise and unique location of each users vehicle, and parking space.

The unique parking space location information may be used by partner locations to accurately deliver orders to users. Or this information may be used by the parking facility operator to keep an inventory of available and unavailable parking spaces.

In some embodiments, a registered location 10 may be an action location comprising a moveable physical barrier 17 with dedicated hardware 15 to access, open or unlock the barrier. The dedicated hardware 15 is connected and in communication with software 12, and software 12 may communicate with the remote processing center 40. In these embodiments, the default action may be to open a barrier or lift a gate arm 5728 separating a first space from a second space, with or without requirement an entrance fee.

In some embodiments, a registered location may be specific to an individual gate, or moveable, physical barrier 17. As non-limiting examples, each locker door in a row of lockers may be a unique registered location. App 20 transmits 530 the geographic information 240 from the electronic device 30 to the remote processing center 40. The center analyzes 540 the geographic information 240. When the received geographic information 240 corresponds 550 with a registered location 10 with software 12, the processing center 40 may communicate with software 12 to signal hardware 15 to open or unlock that gate or other moveable barrier 17. As non-limiting examples, in these instances, the moveable physical barrier 17 may, when opened, grant access to a locker, a storage space, hotel room, or any other secured space. This system may increase security over conventional locking systems.

Non-limiting examples of dedicated hardware 15 may be a lock, hardware to raise and lower a gate arm, or open and close any gate or barrier, an electric eye, security keypad, or any other security equipment that locks/unlocks, or opens/closes or otherwise grants access to a secured space.

Software 12 may receive instructions from remote processing center 40, instructing software 12 to communicate with equipment 15 to execute various default actions. As non-limiting examples, in response to instructions from the remote processing center 40, software 12 may communicate with equipment 15 to open or close a barrier 5724, lock or unlock a door 5726, lift or lower a gate arm 5728, transmit a purchase amount 5725, create a time-stamp that notes a specific point in time 575, or do any other software executable action 5727, or any combination thereof. See FIG. 14.

A combination executable action may comprise associating mobile device 30 with a time-stamp for the opening or closing of a moveable physical barrier 17. As a non-limiting example, a registered parking facility 10 may have a gate arm, gate or other moveable, physical barrier 17. In some of these embodiments, a user may open or run 530 the app 20 at the registered parking facility 10 with a gate arm 17*a*. When the processing center 40 finds correspondence 550 between the user's geographic information 240, and the geographic information 110 of a registered parking facility 10 and in accordance with a linked default action, the processing center may instruct software 12 to raise a gate arm 5728, and also may generate a time-stamp 575, recording the time the gate arm 17*a* raises. The open gate arm allows the associated vehicle and mobile internet-connected device 30 to enter the parking facility 10. The processing center opens 577 a unique parking session record 11, which comprises the associated device 30, vehicle information 220*a*, and the time-stamped entrance with a registered parking facility.

In these embodiments, the barrier closes after the vehicle enters. The barrier may close in response to instructions sent by the remote processing center 40 to the barrier software 12; or may close after a certain amount of time; or may close when the vehicle triggers a vehicle detector, including when a vehicle triggers an integrated loop; or may close in response to a user request.

The system is not limited to parking embodiments. Other embodiments may be used to grant access to secured spaces with or without payment of a fee. The system may be used as described herein in any other instance where a moveable physical barrier 17 opens or unlocks to grant access to a secured space, or in any instance where a security system is used for homes, hotels, businesses, museums, banks or other secured spaces. Upon finding geographic correspondence 550, and verification of other owner parameters 120 and user parameters 220, the remote processing center 40 may signal software 12 to deactivate any security system operated by equipment 15, thereby permitting the end user to access the secured space.

Another default action may be to activate 532 a scanner 32. This default action is linked 250 to registered locations 10 coupled with registered readable code 14. In these embodiments, the registered readable code may provide additional verification that the associated mobile device 30 is at a specific geographic location.

Readable code is registered and stored with the processing center 40 by coupling the code 14 with a registered location 10 where the linked default action 250 for that registered location is to turn on scanner 532, and transmit the scanned code 14 to the processing center 40. See FIGS. 3 and 4. The readable code 14 may also comprise any other merchant or owner parameter 120 that is desired. Or the merchant/owner parameters 120 for the specific readable code 14 may be stored in the remote processing center.

The registered readable code 14 may be displayed in either tangible or intangible form. Non-limiting examples of tangible display include bar codes, QR codes, or near field communication tags, stickers or paper. Non-limiting examples of intangible display include display on screens, or RFID. It is apparent that any means for displaying coded information may be used.

In these embodiments, the user may launch or run app 20 on electronic device 30 with a camera, scanner or other reader (collectively "scanner") 32.

The processing center analyzes 540 the geographic information 240. When geographic information 240 transmitted from an end user's associated mobile device 30 corresponds 550 to a registered location 10 with registered readable code 14, the linked default action 250 activates scanner 532. The processing center 40 activates scanner 532 by transmitting, via the internet, instructions 532 to the app 20 on electronic device 30 activating scanner 32. See FIG. 4. Upon receipt, analysis and verification of this transmission 5721, the processing center transmits instructions 5723 to software 12 connected with that registered readable code 14.

The end user approaches the display of registered readable code 14 and positions activated scanner 32 to scan code 14. App 20 transmits 5721 the scanned code 14 to processing center 40. The processing center 40 analyzes the transmitted registered readable code 14, verifying the exact location of the user.

This additional verification may be useful in instances where the system may find correspondence 550 between a plurality of associated devices, and a single registered location 10 at the same time. As a non-limiting example, a line of vehicles with associated devices 30 running the app 20 may be queued to enter a registered parking facility 10 with a moveable physical barrier 17 that is opened and closed by equipment 15. See FIG. 18. In these instances, the system may find correspondence 550 between a plurality of associated vehicles and devices, and a single registered parking facility 10. Registered readable code is displayed within scanning distance of the first vehicle in front of barrier 17. See FIG. 18. Only the first user in line in within scanning distance of registered readable code 14. The activated scanner 32 may scan and transmit the registered readable code 14 to the processing center. The processing center 40 analyzes the transmitted code 14 and communicates instructions to software 12 and thereby to equipment 15 to open barrier 17. Processing center 40 also generates an open parking session record 11a associating a specific mobile device 30 with the time the barrier is opened. Scanning the registered readable code by device 30 provides additional verification that open parking session record 11a is properly associated with a specific mobile device 30.

The system is not limited to parking facilities and may be used with any moveable physical barrier 17 connected with equipment 15 that opens/closes or locks/unlocks, in response to instructions from software 12, to separate a secured space from a non-secured space, to open/close a moveable physical barrier or gate 5724, or to raise or lower a gate arm 5728, or to lock or unlock a door 5726. In these embodiments, the processing center 40 analyzes the transmitted code 14 and communicates instructions to software 12, which may directly execute the instruction, or may further instruct equipment 15 to execute the instruction to open the barrier 17 or to deactivate security system.

In some embodiments, software 12 may be connected with readable code 14 displayed at a single cash register, or displayed on a single parking meter, or displayed on any other unique registered location 10. After readable code 14 is transmitted 5721 from the scanner 32, and the processing center finds correspondence 550, the processing center 40 send instructions to software 12 in communication with a registered cash register, parking space or other unique registered location 10. In some embodiments, the instructions may be to complete the transaction shown on the cash register 5772. In some embodiments, the instruction is for other software executable action 5727, such sending an access code to the user. An access code may be an alphanumeric code that the user enters in a keypad that opens or unlocks a gate or moveable physical barrier 17; or an access code may be a QR code that is displayed on the end users mobile device; or an access code may be another other shape, code, display or design that may be transmitted to the end user's mobile device and used to grant access to a secured space.

The readable code 14 is entered and stored in the system using techniques known by those skilled in the art to couple coded information with tangible or intangible media. The code 14 may contain geographic data 110 linked to a specific location 10, or geographic data coupled with a specific display of code may be entered and stored in remote processing center 40. The geographic information of registered readable code may be the same as the merchant geographic information 110 of an entire facility. Or the geographic information 110 may be the location of a single parking space, on the street or in a parking facility. Thus, each display of registered readable code may function as a registered location 10, with registered geographic information 110. In addition, any other information may be encoded in registered readable code 14, as a non-limiting example, a rate structure.

In some embodiments, when the end user is within a secured space with a moveable physical barrier 17, and the user wishes to exit, the end user transmits, via the associated mobile device 30 to the remote processing center 40, a request to exit 260 the registered location. A request to exit 260 has many embodiments. As non-limiting examples, a request to exit may be entered by the end user into mobile device 30 and transmitted from the mobile device to the remote processing center; may be initiated in response to geographic location information 240 transmitted from the mobile device to the processing center; the request to exit may be initiated when a vehicle or person triggers a detector including but not limited to passing over an integrated loop; or the request may be made by scanning, via a camera on mobile device 30, registered readable code 14 that is coupled with an exit from a registered location.

In some embodiments, a request to exit 260 comprises an exit loop vehicle detector that is a registered location 10 with a geo-fence. In these embodiments, the size of the geo-fence 551 is directly associated with the size of the loop. Thus, the loop geo-fence 551 is the size needed to detect a single loop, and may be the exact size of a loop. In these embodiments, when the end user's mobile device transmitted geographic location 240 is within the loop geo-fence 551, the default action opens the moveable barrier 17, and the associated vehicle, mobile device and end user may exit the facility.

In some embodiments, a request to exit 260 comprises receiving, by the processing center, geographic information 240 transmitted from mobile device 30, finding correspondence 550 and an open session record 11a associated to this registered location 10. Upon receiving such a request to exit, processing center 40 may attach an ending time-stamp, charge the user per the user payment option 210, instruct software 12 to open the barrier, and close 11b the unique session record. Barrier 17 closes after the end user exits the facility.

Other embodiments of the invention may be used to charge incremental fees for access to secured spaces such as lockers, hotel rooms or storage spaces. These embodiments allow registered facility 10 to charge fees 120a based on increments of time.

In some embodiments, a request to exit may comprise scanning registered readable code 14 at a registered location. The code may be displayed so that only the person immediately before the exit may scan the display, to verify that a particular user is first in line to exit. In these embodiments, the user is already within geofence 551, and the default action 532 activates scanner. The end user positions scanner 32 to scan code 14 displayed at the exit. A request to exit comprises scanning and transmitting to processing center 40 registered readable code 14 that is coupled with a registered location exit; analyzing, by the processing center, the transmitted information; and finding an open session record 11a associated with the mobile device 30 transmitting code 14, wherein the processing center will transmit to software 12 instructions to signal hardware 15 to open the exit barrier 17.

In other embodiments, a request to exit comprises triggering a detector when user is in front of, or at, the exit point. As non-limiting examples, these comprise light detection systems, integrated loops, vehicle detection methods, and electronic eyes. The system receives information that the detector has been triggered, and receives geographic information 240 transmitted from the mobile device 30 at the detector. Upon finding correspondence 550, the processing center opens the moveable physical barrier 17.

In some embodiments, the system allows a user to access information regarding all registered locations 10 of a specific type within a specified distance. The user may set or modify the distance range. As a non-limiting example, the user may request the system to locate all registered parking facilities 10 within specific distance of the user's current location. In these embodiments, system maintains a real-time log of parking space availability. The invention may show the user all registered parking facilities 10 that are remote from the user's current location, and may show parking availability at each of registered location.

In some embodiments, the user may review, reserve and/or purchase parking at a remote parking facility, either on a one-time basis, or on a regular basis. On a one-time basis, upon finding an available parking spot at a registered facility 10, the system may notify the user via the electronic device 30, and the user may then enter information into the electronic device to reserve and/or pay for the remote parking spot.

Or the user may reserve, and pay for, a parking space at a specific designated spot for specific periods of time. Non-limiting examples of periods of time are minutes, hours, days, weeks, and months.

In other embodiments, the application activates only after stopping at a registered location 10. In one embodiment, when user with an electronic device 30 containing the app 20 is stopped for a set period of time at registered parking facility 10, the application 20 will automatically prompt the user and request confirmation of payment. This feature only activates when the electronic device 30, presumably inside a vehicle with a user, are stationary. The user will be charged only after arriving and stopping the vehicle at a registered parking facility.

Figure 10:
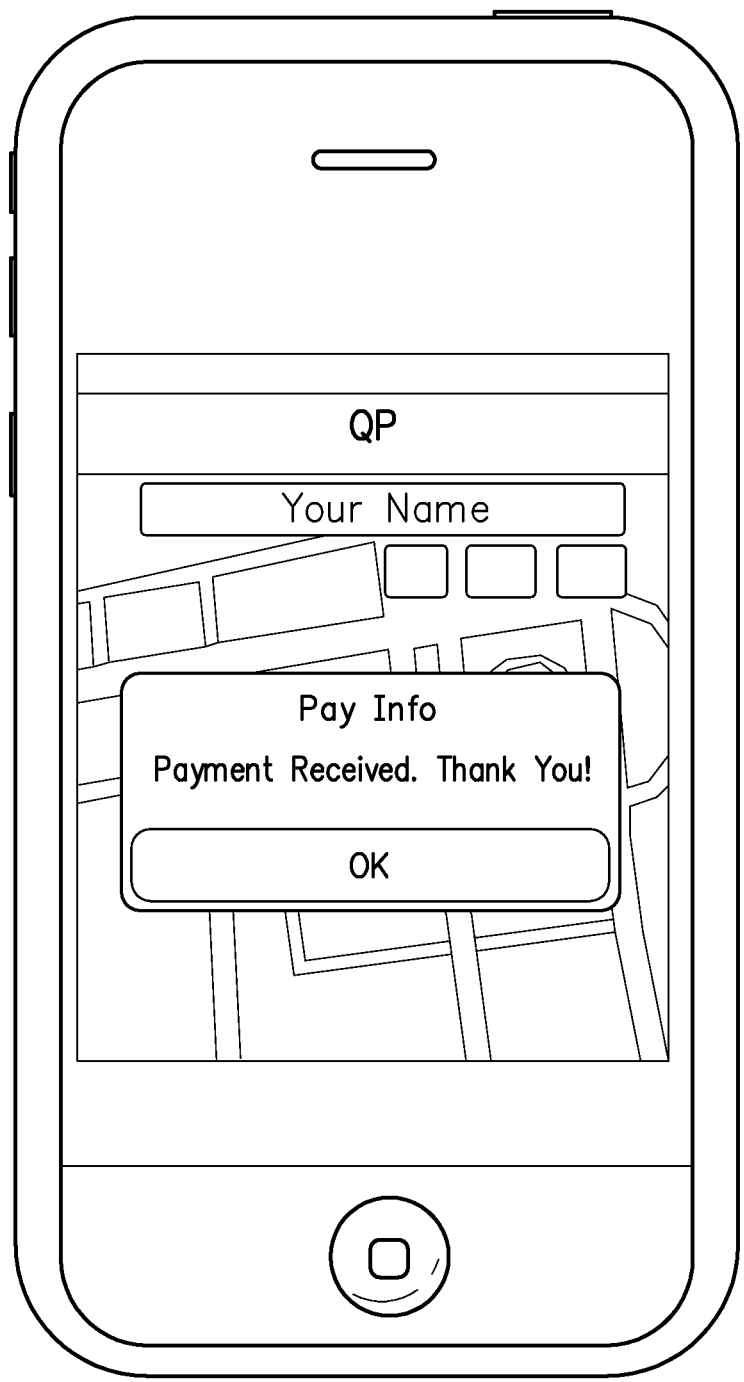
FIG. 10 is a screen shot of an embodiment of the invention, showing a receipt or confirmation message.

In some embodiments, after completing the transaction or executing other action, the processing center may communicate confirmation 19 of the transaction or action. This confirmation 19 may be communicated by email, text message, mail, XML, or any other method of communication. The confirmation may be sent to the user, to the registered facility or to both. The confirmation may contain different information, as requested by the user, or as requested by the merchant, owner or operator of the registered location. The system may send a confirmation 19 to screen 31 of the mobile device of the end user, confirming the amount of payment, and that the payment has been made and received, or other information. See FIGS. 10 and 11. Alternatively, the user may chose to have a confirmation 19 sent by email, text message, instant message or any other form of communication. FIG. 11 shows a screen shot of a user confirmation receipt on a mobile device.

The confirmation step 19 allows a parking facility merchant to have detailed, real-time information regarding parking at the registered parking facility, which may optionally include the vehicle information, and the time of entering and leaving the facility, location within the facility of the parked vehicle, parking and driving patterns of individual vehicles, and driving patterns in general. One embodiment of the invention may include a real-time running log, showing all transactions made using the system. See FIG. 12. In another embodiment, the system may use photos or video to record the license plates of vehicles using the facility, and send this information to the parking facility operator. This information can be used to verify that all license plates are registered users.

Merchants may use this information to target advertising, or to help with parking crowding issues. Merchants may also use this information to optionally provide real-time parking space availability information to end users.

The system also allows a registered third-party merchant to validate parking of a user with mobile device 30 parked at a registered facility 10. In these embodiments, the registered third-party merchant may access the system, enter user identification information, and the amount of the parking validation.

Some embodiments of the system analyze text messages of registered users to perform specific actions. To register with the system, a new user dials a specific number or text message address and transmits a text message containing a unique identification code for a registered parking facility 10. The processing center analyzes the incoming text message, and determines that the message is being sent from a mobile device 30 that is not linked to the registered parking facility 10, as a non-limiting example, from the caller ID of the mobile device. The processing center 40 transmits this new user's message to a voice dialog manager. The voice dialog manager may call the user, using the caller ID linked to the text message, and query the user for payment information, user information, and vehicle license plate information. The voice dialog manager may optionally prompt the user to scan or photograph the user's payment card, ID card, license plate, or other item. The functions performed by the voice dialog manager may be performed by other similar methods known in the art. The processing center will thereafter recognize that this user mobile phone number is linked with this registered facility, and the user will be registered.

Thereafter, when the processing center receives a text message from this registered mobile phone number, and the text message identifies this particular registered facility using the registration code, the processing center will execute a default action.

As a non-limiting examples, the processing center may charge the user a flat parking rate, may time-stamp receipt of the text message, begin charging the user a parking fee based on increments of time, and open a unique parking session record linked to that user's mobile device. The processing center may also optionally lift a gate arm, or open a moveable barrier, allowing the vehicle access to the parking facility. When the user wishes to exit the parking facility, the user texts the processing center. The processing center analyzes the text message and caller ID, determines there is an open unique parking session record linked to that particular caller ID. The processing center calculates the passage of time and the resulting parking fee, charges the user, and may optionally lift a gate arm, allowing the user's vehicle to exit, and closes the unique parking session record.

In other instances, upon receipt of a verified text message, the processing center sends a command via the internet to software at the registered location, which executes a default action. The command may be to open or close and/or lock or unlock a gate, garage, door, vault, to lift or lower a gate arm, to turn on or off a laser security system, to request additional information, or other action that may be implemented by a processing center command sent via the internet to software at a registered location.

In other instances, upon receipt of a verified text message, the processing center sends a command via the internet to software at the registered location, which executes a default action. The command may be to open and/or unlock a gate, garage, door, vault, to lift a gate arm, to turn on or off a laser security system, to request additional information, or other action that may be implemented by a processing center command sent via the internet to software at a registered location.

In some embodiments, a registered user may use the system to pay for incremental parking, by time-stamping entry and exit times. A registered user dials a specific number or text message address and transmits a text message containing a unique identification code for a registered parking facility linked to this registered user. When the information is verified, the processing center executes a default action. As a non-limiting example, a user texts the identification information for a registered parking facility, and the processing center time-stamp entry of the user's vehicle, and may begin charging the user a parking fee based on increments of time. To exit, the user texts the processing center, and the processing center determines the text message is from a user with a entry time-stamp, calculates the passage of time and the resulting parking fee, charges the user, and may optionally lift a gate arm, allowing the user's vehicle to exit.

Other embodiments are an optional features that may remind a user that an incremental paid parking time is about to expire; payment is due; or an optional feature allowing the designated parking facility to bill the user directly if the user leaves without paying.

In another embodiment, the system has a time-delay feature. In this embodiment, the user may affirm the parking facility and payment charge, and the time-delay embodiment may charge the user after a specified period of time before processing the payment charge. The time-delay option will generally be in the range of 5-15 minutes, and allows a user to leave the parking facility without paying if the user changes his or her mind about parking at that time.

The invention described herein can be implemented in the form of control logic using computer software in a modular or integrated manner. Based on the specification, a person of ordinary skill will know and appreciate other methods or systems to implement this invention.

The invention may be embodied in other specific forms without departing from the spirit or essential characteristics thereof. The embodiments disclosed in this specification are to be considered in all respects as illustrative and not restrictive, and all changes that come within the meaning and range of equivalency of the claims are intended to be embraced therein. One or more features from any embodiment may be combined with one or more features of any other embodiment without departing from the scope of the invention.

The embodiments described herein refer to one mobile phone, user, application, merchant and provider. It is understood that there can be more than one mobile phone, user, application, merchant or provider. A recitation of "user" is intended to mean any individual, whether or not that individual is making a purchase. A recitation of "a" "an" or "the" is intended to mean "one or more" unless specifically indicated to the contrary.

What is claimed is:

1. A system for location-based entrance into at least one parking facility, comprising:
one or more processors configured to:
enter, into a remote processing center, geographic information and a parking rate structure for at least one parking facility with at least one moveable physical barrier connected with hardware connected with software in communication with the remote processing center,
wherein upon entry of the geographic information and the parking rate structure of a parking facility, the remote processing center recognizes the parking facility and connected software as a specific registered parking facility;
at least one mobile internet-connected device with an application, wherein the application enables communication between the mobile device and remote processing center, transmitting information, instructions and signals between the device and processing center;
the one or more processors configured to enter, into the remote processing center, end user information comprising at least one end user payment option and identifying information for at least one vehicle,
the remote processing center configured to associate a specific mobile device with a specific end user, payment option and vehicle;
the one or more processors configured to transmit information comprising a current geographic location of the associated mobile device from the associated mobile device via the internet to the remote processing center;
the remote processing center configured to analyze to determine correspondence between the current geographic information transmitted from the associated mobile device and geographic information of a specific registered parking facility, and when analysis finds correspondence; and
the one or more processors configured to:
transmit instructions, from the remote processing center to the connected software and hardware at the specific registered parking facility, to open the barrier; and
charge the end user's payment option according to the specific parking facility rate structure.

2. The system of claim 1 wherein the barrier is selected from the group consisting essentially of doors, rolling doors, sliding doors, garage doors, rolling gates, gate arms, sliding gates, and moveable barriers.

3. The system of claim 1 wherein the parking rate structure comprises incremental timed rates, flat rates, monthly rates, yearly rates, daily rates, hourly rates, minute rates, rates based on usage, special event rates, rates based on time of day, rates based on day of week, validated parking rates, company-sponsored rates, and any combination thereof.

4. The system of claim 3 wherein a company-sponsored rate comprises a rate paid by a third party.

5. The system of claim 1 wherein the end user enters end user information through the mobile internet connected device.

6. The system of claim 1 wherein the end user enters end user information through a computer.

7. The system of claim 1, wherein the mobile internet connected device is permanently connected with the associated vehicle.

8. The system of claim 1, wherein the mobile internet connected device is independent of the associated vehicle.

9. The system of claim 1 wherein the end user payment option is selected from the group consisting of credit card, debit card, check, cash, online account, gift card, and company-sponsored payment.

10. The system of claim 1 wherein a consumer payment option is linked to a specific registered location.

11. A system for location-based entry and exit into at least one parking facility, comprising:
one or more processors configured to:
enter, into a remote processing center, geographic information and a parking rate structure of at least one parking facility with at least one moveable physical barrier connected with hardware connected with software in communication with the remote processing center, and registered readable code wherein the registered readable code is displayed within scanning distance of a vehicle in front of the barrier,
wherein upon entry of the geographic information and the parking rate structure of a parking facility, the remote processing center recognizes the parking facility and connected software as a specific registered parking facility;
at least one mobile internet-connected device with an application and a scanner, wherein the application enables communication between the mobile device and remote processing center, transmitting information, instructions and signals between the device and processing center;

the one or more processors configured to enter, into the remote processing center, end user information comprising at least one end user payment option and identifying information for at least one vehicle;

the remote processing center configured to associate a specific mobile device with a specific end user, payment option and vehicle;

the one or more processors configured to transmit, from an associated mobile device via the internet to the remote processing center, information comprising a current geographic location of the mobile device;

the remote processing center configured to analyze to determine correspondence between the current geographic information transmitted from the associated mobile device and the geographic information of a specific registered parking facility, and when finding correspondence;

the one or more processors configured to transmit instructions from the processing center to the associated mobile device to activate the scanner on the associated mobile device;

the activated scanner configured to scan the registered readable code displayed within scanning distance of the barrier;

the one or more processors configured to:
transmit, from the associated mobile device to the remote processing center, the scanned code;
transmit instructions, from the processing center to the connected software and hardware at the specific registered parking facility, to open the barrier, wherein the associated mobile device and vehicle enter the parking facility, the barrier closes and a parking session begins at a beginning time;

the remote processing center configured to associate the parking session beginning time, vehicle information, end user information and specific mobile device, thereby comprising an open unique parking session record;

the one or more processors configured to, when the parking session ends, transmit, from the associated mobile device to the remote processing center via the internet, a request to exit the parking facility;

the remote processing center configured to analyze the request to exit and when analysis by the remote processing center finds an open unique parking session record associated with the mobile device, transmitting the request to exit;

the one or more processors configured to transmit, from the remote processing center to the connected software and hardware, instructions to open the barrier, wherein the associated mobile device and vehicle exit the parking facility, the barrier closes, and the parking session ends at an ending time;

the remote processing center configured to:
record the ending time, and closing the unique parking session record;
calculate an end user payment based on the parking facility rate structure, and the unique parking session record; and the one or more processors configured to charge the end user's payment option the calculated fee.

12. The system of claim 11 wherein the request to exit comprises the end user entering a request to exit on the mobile device.

13. The system of claim 11 wherein the request to exit comprises transmission, from the mobile device to the remote processing center, the geographic location of an exit loop geo-fence.

14. The system of claim 11 wherein the request to exit comprises scanning, by the activated scanner, the display of registered readable code and transmitting, from the associated mobile device to the remote processing center, the scanned code.

15. The system of claim 11 wherein the registered readable code is selected from the group consisting essentially of bar codes, QR codes, near field communication tags, stickers, and radio-frequency identification.

* * * * *